(12) United States Patent
Pobedinski et al.

(10) Patent No.: US 10,113,408 B2
(45) Date of Patent: Oct. 30, 2018

(54) INTEGRATED DRILLING CONTROL SYSTEM

(71) Applicant: Weatherford Technology Holdings, LLC, Houston, TX (US)

(72) Inventors: Ilia Pobedinski, Houston, TX (US); Sanjit Roy, Katy, TX (US); Ferhat Gumus, Houston, TX (US); Koray Kinik, Houston, TX (US); Iain Cook, Spring, TX (US); Lev Ring, Houston, TX (US); Guy Feasey, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 419 days.

(21) Appl. No.: 14/874,613

(22) Filed: Oct. 5, 2015

(65) Prior Publication Data
US 2016/0097270 A1 Apr. 7, 2016

Related U.S. Application Data

(60) Provisional application No. 62/059,552, filed on Oct. 3, 2014.

(51) Int. Cl.
*G05B 17/02* (2006.01)
*E21B 44/00* (2006.01)
*E21B 21/08* (2006.01)

(52) U.S. Cl.
CPC .............. *E21B 44/00* (2013.01); *E21B 21/08* (2013.01); *G05B 17/02* (2013.01)

(58) Field of Classification Search
None
See application file for complete search history.

(56) References Cited

U.S. PATENT DOCUMENTS

2005/0216116 A1* 9/2005 Nield ...................... B66D 1/40
700/213

2005/0235745 A1* 10/2005 Proett ..................... E21B 49/08
73/152.22

(Continued)

FOREIGN PATENT DOCUMENTS

WO       2010062635            6/2010
WO    WO 2010062635 A2 *   6/2010 ............. E21B 49/08

OTHER PUBLICATIONS

Weatherford—Drilling Engineering Association, Quarterly Meeting; "Continuous Flow Sub System"; Jun. 23, 2009; pp 1-10.
McCaskill, John et al.; "Managing Wellbore Pressure While Drilling"; Manged Pressure Drilling; Drilling Contractor; Mar./Apr. 2006; pp. 40-42.
National Oilwell Varco; "NOVOS Operating System"; www.nov.com/novos; copyrighted 2012; pp. 1-2.
National Oilwell Varco; "NOVOS Operating System"; http://www.nov.com/novos; obtained from website Sep. 9, 2014; pp. 1-5.

(Continued)

*Primary Examiner* — Isaac T Tecklu
(74) *Attorney, Agent, or Firm* — Blank Rome, LLP

(57) ABSTRACT

A computerized control system performs controlled pressure drilling in a formation with a drilling system according to a plan. A setup of at least the plan, the formation, and the drilling system is configured in the control system, and the setup is integrated with the drilling system. Functioning of the set up can then be conducted using one of a plurality of control modes, including an operating mode and a simulating mode. The control system functions the setup according to the operating mode for operational interaction with the setup using the integration of the setup with the drilling system. The control system can switch from the operating mode to the simulating mode for simulated interaction with the setup. The control system simulates for at least a time period the functioning of the setup according to the simulating mode using the integration of the setup with the drilling system. Current operations continue as at least one simulated operation or event is projected in the future. Ultimately, results from the simulating mode can be used in the operating mode as further operations continue.

22 Claims, 11 Drawing Sheets

(56) References Cited

U.S. PATENT DOCUMENTS

| | | | | |
|---|---|---|---|---|
| 2007/0079962 A1* | 4/2007 | Zazovsky | ............ | E21B 49/008 166/264 |
| 2009/0157367 A1* | 6/2009 | Meyer | ................ | E21B 7/04 703/10 |
| 2011/0125333 A1* | 5/2011 | Gray | ................ | E21B 21/08 700/282 |
| 2011/0266056 A1* | 11/2011 | Pop | .................. | E21B 49/08 175/50 |
| 2012/0305314 A1* | 12/2012 | Maida, Jr. | ............. | E21B 44/00 175/50 |
| 2013/0289962 A1* | 10/2013 | Wendt | ................ | G01V 1/28 703/10 |
| 2014/0019106 A1* | 1/2014 | Jiang | ................ | E21B 21/08 703/10 |
| 2014/0032192 A1* | 1/2014 | Zamora | ............ | E21B 44/00 703/10 |
| 2014/0209383 A1* | 7/2014 | Vuyk, Jr. | ........... | E21B 41/0035 175/27 |
| 2014/0262246 A1* | 9/2014 | Li | .................... | E21B 21/08 166/250.08 |
| 2016/0003008 A1* | 1/2016 | Uribe | ................ | E21B 43/00 175/50 |

OTHER PUBLICATIONS

Mazerov, Katie; "Industry Investing in New Generation of Forward-Thinking Technologies Even as it Works to Overcome Old Mindsets, Barriers"; Technology Development: A game of risks vs rewards—Drilling Contractor; drillingcontractor.org/technology-development-a-game-of-risks-vs-rewards-19011; obtained from website Sep. 9, 2014; pp. 1-7.

Weatherford; "Weatherford's Managed Pressure Drilling (MPD) Services"; weatherford.com; copyrighted 2005-2010; pp. 1-12.

Weatherford; "Managed Pressure Drilling"; weatherford.com; copyrighted 2007-2008; pp. 1-12.

Weatherford; "Secure Drilling Fluid Systems"; weatherford.com; copyrighted 2007-2010; pp. 1-8.

Weatherford; "SURE Candidate Selection Process"; weatherford.com; copyrighted 2006-2011; pp. 1-5.

Weatherford; "Rotating Control Devices (RCDs)"; weatherford.com; copyrighted 2011; pp. 1-12.

Weatherford; "Closed-Loop Drilling Systems"; weatherford.com; copyrighted 2011; pp. 1-2.

PCT International Search report for PCT/US2015/053964 dated Jan. 22, 2016; pp. 1-13.

Examination Report No. 1 in counterpart AU Appl. 2015327849, dated Nov. 20, 2017, 3-pgs.

* cited by examiner

INTEGRATED DRILLING CONTROL SYSTEM

CROSS-REFERENCE TO RELATED APPLICATIONS

This application claims the benefit of U.S. Prov. Appl. 62/059,552, filed 3 Oct. 2014, which is incorporated herein by reference in its entirety.

BACKGROUND

Several controlled pressure drilling techniques are used to drill wellbores. In general, controlled pressure drilling includes managed pressure drilling (MPD), underbalanced drilling (UBD), and air drilling (AD) operations. In the Underbalanced Drilling (UBD) technique, a UBD system allows the well to flow during the drilling operation. To do this, the UBD system maintains a lighter weight of drilling mud so fluids from the formation being drilled are allowed to enter the well during the operation. To lighten the mud, the UBD system can use a lower density mud in formations having high pressures. Alternatively, the UBD system can inject an inert gas such as nitrogen into the drilling mud. During the UBD operation, a rotating control device (RCD) at the surface allows the drillstring to continue rotating and acts as a seal so produced fluids can be diverted to a mud gas separator. Over all, the UBD system allows operators to drill faster while reducing the chances of damaging the formation.

In the Managed Pressure Drilling (MPD) technique, a MPD system uses a closed and pressurizable mud-return system, a rotating control device (RCD), and a choke manifold to control the wellbore pressure during drilling. The various MPD techniques used in the industry allow operators to drill successfully in conditions where conventional technology simply will not work by allowing operators to manage the pressure in a controlled fashion during drilling.

During drilling, for example, the bit drills through a formation, and pores become exposed and opened. As a result, formation fluids (i.e., gas) can mix with the drilling mud. The drilling system then pumps this gas, drilling mud, and the formation cuttings back to the surface. As the gas rises up the borehole in an open system, the gas expands and hydrostatic pressure decreases, meaning more gas from the formation may be able to enter the wellbore. If the hydrostatic pressure is less than the formation pressure, then even more gas can enter the wellbore.

A core function of managed pressure drilling attempts to control kicks or influxes of fluids as described above. This can be achieved using an automated choke response in a closed and pressurized circulating system made possible by the rotating control device. A control system controls the chokes with an automated response by monitoring flow in and out of the well, and software algorithms in the control system seek to maintain a mass flow balance. If a deviation from mass balance is identified, the control system initiates an automated choke response that changes the well's annular pressure profile and thereby changes the wellbore's equivalent mud weight. This automated capability of the control system allows the system to perform dynamic well control or CBHP techniques.

In deep water applications, well control can be more difficult. For example, an influx downhole goes up through the wellbore and riser and may be harder to detect. Additionally, any fluid from the influx may reach its bubble point in the riser and travel to the wellhead as gas. Other issues for deep water applications include Wellbore stability, high pressure, high temperature, Ballooning/Breathing, Tight Margins, Water depth, etc.

In addition to kick detection and automated choke control, various other operations are necessary on the rig to drill the well effectively and efficiently. Traditionally, drilling services used for managed pressured drilling have been delivered discretely with limited to no coordination or communication between hardware, software, and application support. As expected, this arrangement adds complexity and inefficiencies to the drilling process.

What is needed is drilling control system that integrates controlled pressure drilling and other drilling performance functions together.

The subject matter of the present disclosure is directed to overcoming, or at least reducing the effects of, one or more of the problems set forth above.

SUMMARY OF THE DISCLOSURE

A method of performing controlled pressure drilling in a formation with a drilling system according to a plan involves configuring, with a computerized control system, a setup of at least the plan, the formation, and the drilling system and involves integrating the setup of the computerized control system with the drilling system. The method involves functioning, with the computerized control system, the setup according to an operating mode for operational interaction with the setup using the integration of the setup with the drilling system. The method further involves switching, at the computerized control system, from the operating mode to a simulating mode for simulated interaction with the setup; and simulating, with the computerized control system for a time period, the functioning of the setup according to the simulating mode using the integration of the setup with the drilling system.

To configure the setup, information is configured pertaining to a borehole, the formation, surface equipment, piping, wellsite data, casing, drillstring, drilling trajectory, fluid properties, and the like. Integrating the setup of the computerized control system with the drilling system can involve acquiring current data of the drilling system performing the controlled pressure drilling according to the plan in the formation while functioning in the operational control mode.

To simulate the functioning of the setup, the functioning of at least one simulated operation can be simulated of the setup projected over the time period in the future while using the currently acquired data. A rate can be set at which the time period advances in the future for the at least one simulated operation. To simulate the functioning, one or more algorithms of the computerized control system can model the functioning of the at least one simulated operation in the formation with the drilling system according to the plan.

While simulating the functioning of the setup, the method can continue the functioning, with the computerized control system, of the setup according to the operating mode. At some point, the method can involve switching, at the computerized control system, from the simulating mode back to the operating mode; and providing, at the computerized control system, a result from the at least one simulated operation in the operating mode.

In one example, the at least one simulated operation can be an anticipated event, and the provided result can be a modelled response for the anticipated event. As operations then continue, the control system can monitor for the anticipated event and can at least partially implement the modelled response.

Functioning the setup according to the operating and simulating modes can involve functioning the setup according to one of a plurality of operations for operating the setup within the given mode. The operations can include one or more of: an in-casing test operation, a drilling operation of performing drilling of a borehole, a connection operation of performing a connection of drillpipe, a tripping operation of tripping drillpipe out of the borehole, a circulation operation of circulating fluid in the borehole, a reaming operation of reaming the borehole, a well control operation of handling a kick or a loss while drilling the borehole, and an offline operation.

Moreover, the operations can include one or more controls selected from the group consisting of a proportional gain control, an integral time control, a choke control, a connection control, a Leak Off Test (LOT), a Formation Integrity Test (FIT), a cement control, a pill, a kick control, and a loss control.

Other than the operating and simulating modes, the control system can have a monitoring mode for monitoring current interaction with the setup and can have a reviewing mode for replaying past interaction with the setup.

A method of performing controlled pressure drilling in a formation with a drilling system according to a plan involves configuring, with a computerized control system, a setup of at least the plan, the formation, and the drilling system; and integrating the setup of the computerized control system with the drilling system.

The method involves indicating, at the computerized control system, a selection of one of a plurality of control modes for interacting with the setup, the control modes at least including (i) an operating mode for operational interaction with the setup and (ii) a simulating mode for simulated interaction with the setup. Additionally, the method involves indicating, at the computerized control system, a selection of one of a plurality of operations for operating the setup. Finally, the method involves functioning, with the computerized control system, the setup according to the selected operation within the selected control mode.

A programmable storage device having program instructions stored thereon for causing a programmable control device to perform a method of according to the present disclosure. Moreover, a computerized control system can be configured according to the present disclosure for a drilling system that performs controlled pressure drilling in a formation according to a plan. In general, the system can include storage, communication equipment, and processing equipment.

The foregoing summary is not intended to summarize each potential embodiment or every aspect of the present disclosure.

DETAILED DESCRIPTION

A. System Overview

Figure 1A:
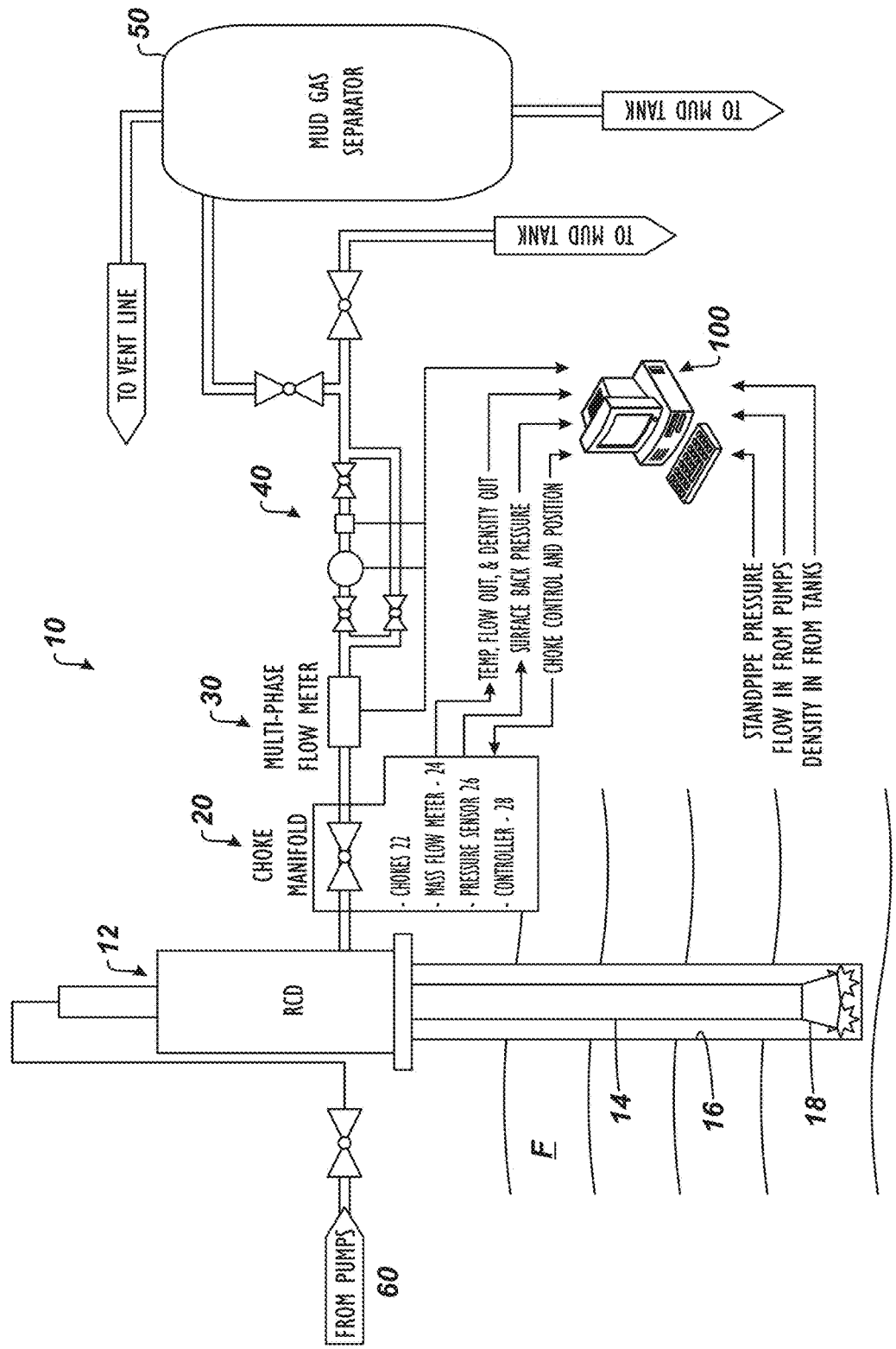
FIGS. 1A-1B show controlled pressure drilling systems having a control system according to the present disclosure.
Figure 1B:
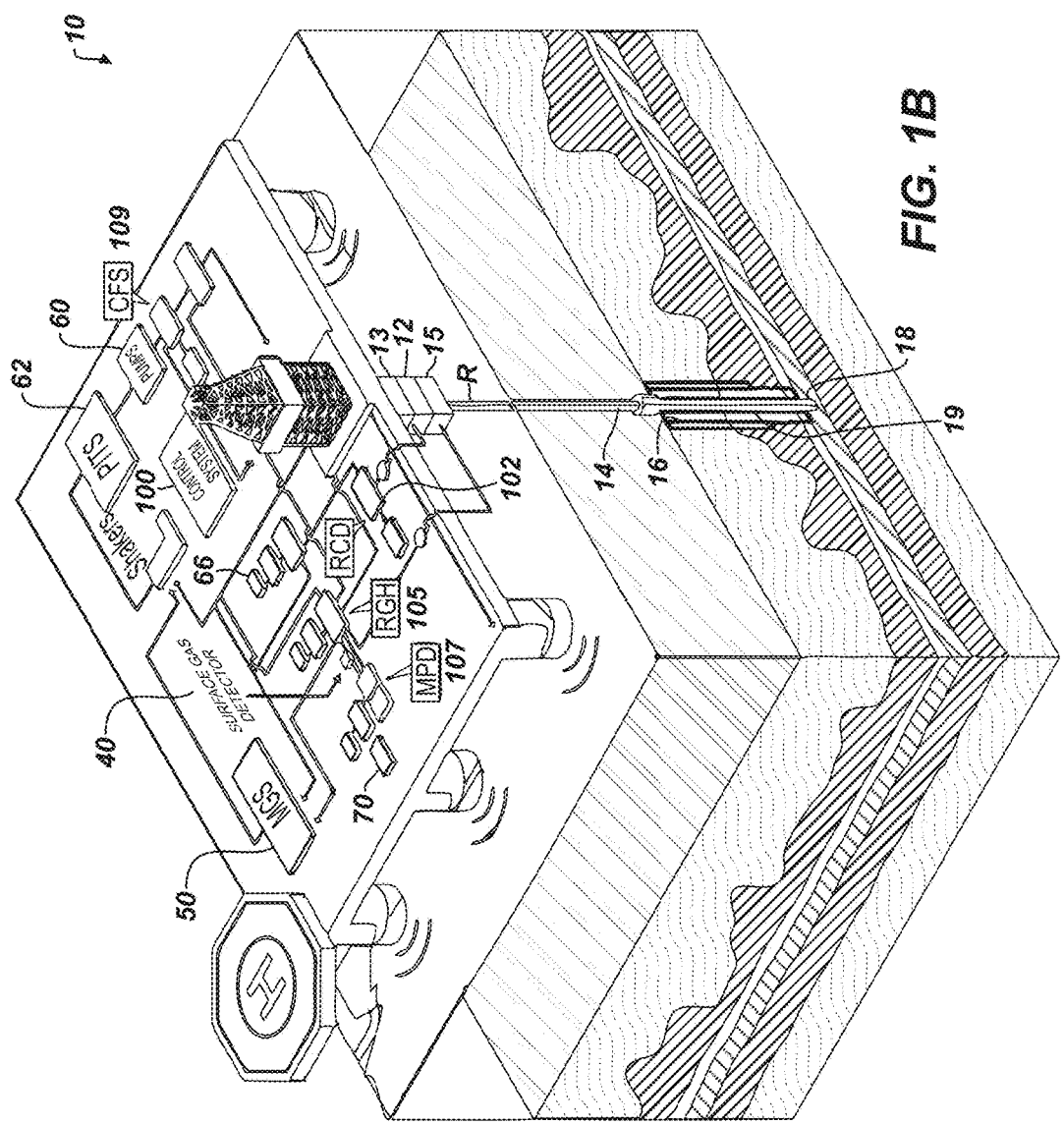

FIGS. 1A-1B shows a controlled pressure drilling system 10 according to the present disclosure. As shown and discussed herein, this system 10 can be a Managed Pressure Drilling (MPD) system and, more particularly, a Constant Bottomhole Pressure (CBHP) form of MPD system. Although discussed in this context, the teachings of the present disclosure can apply equally to other types of controlled pressure drilling systems, such as other MPD systems (Pressurized Mud-Cap Drilling, Returns-Flow-Control Drilling, Dual Gradient Drilling, etc.) as well as to Underbalanced Drilling (UBD) systems, as will be appreciated by one skilled in the art having the benefit of the present disclosure.

Turning first to FIG. 1A, the MPD system 10 has a rotating control device (RCD) 12 from which a drill string 14 and drill bit 18 affixed below the bottom hole assembly (BHA) extend downhole in a wellbore 16 through a formation F. The rotating control device 12 can include any suitable pressure containment device that keeps the wellbore in a closed-loop at all times while the wellbore is being drilled. The system 10 also includes mud pumps 60, a standpipe (not shown), a mud tank (not shown), a mud gas separator 50, and various flow lines, as well as other conventional components.

In addition to these, the MPD system 10 includes an automated choke manifold 20 that is incorporated into the other components of the system 10. Finally, a computerized control system 100 of the drilling system 10 is centralized and integrates hardware, software, and applications across the drilling system 10. The centralized control system 100 is used for monitoring, measuring, and controlling parameters of the drilling system 10.

The automated choke manifold 20 manages pressure during drilling and is incorporated into the system 10 downstream from the rotating control device 12 and upstream from the gas separator 50. The manifold 20 has chokes 22, a mass flow meter 24, pressure sensors 26, a controller 28 to control operation of the manifold 20, and a hydraulic power unit (not shown) and/or electric motor to actuate the chokes 22. The control system 100 is communicatively coupled to the manifold 20 and has a control panel with a user interface and processing capabilities to monitor and control the manifold 20. The mass flow meter 22 can be a Coriolis type of flow meter.

One suitable drilling system 10 with choke manifold 20 for the present disclosure is the Secure Drilling™ System available from Weatherford. Details related to such a system are disclosed in U.S. Pat. No. 7,044,237, which is incorporated herein by reference in its entirety.

The drilling system 10 uses the rotating control device 12 to keep the well closed to atmospheric conditions. Fluid leaving the well bore 16 flows through the automated choke manifold 20, which measures return flow and density using the Coriolis flow meter 24 installed in line with the chokes 22. Software components of the manifold 20 then compare the flow rate in and out of the wellbore 16, the injection pressure (or standpipe pressure), the surface backpressure (measured upstream from the drilling chokes 22), the position of the chokes 22, and the mud density. Comparing these variables, the control system 100 identifies minute downhole influxes and losses on a real-time basis to manage the annulus pressure during drilling. All of the monitored information can be displayed for the operator on the control panel of the control system 100.

As can be seen, the control system 100 monitors for any deviations in values during drilling operations, and alerts the operators of any problems that might be caused by a fluid influx into the wellbore 16 from the formation F or a loss of drilling mud into the formation F. In addition, the control system 100 can automatically detect, control, and circulate out such influxes by operating the chokes 22 on the choke manifold 20.

For example, a possible fluid influx can be noted when the "flow out" value (measured from flow meter 24) deviates from the "flow in" value (measured from the mud pumps 60). When an influx is detected, an alert notifies the operator to apply the brake until it is confirmed safe to drill. Meanwhile, no change in the mud pump rate is needed at this stage.

In a form of auto kick control, however, the control system 100 automatically closes the chokes 22 to increase surface backpressure in the wellbore annulus until mass balance is established and the influx is stopped. Next, the system 100 adds a predefined amount of pressure as safety factor and circulates the influx out of the well by controlling Stand Pipe Pressure. Stand Pipe Pressure will be maintained constant by automatically adjusting the surface backpressure, thereby increasing the downhole circulating pressure and avoiding a secondary influx. A conceptualized trip tank is monitored for surface fluid volume changes because conventional pit gain measurements are usually not very precise. This can all be monitored and displayed on the control system 100 to offer additional control of these steps.

On the other hand, a possible fluid loss can be noted when the "flow in" value (measured from the pumps 60) is greater than the "flow out" value (measured by the flow meter 24). Similar steps as those above, but suited for fluid loss, can then be implemented by the control system 100 to manage the pressure during drilling in this situation.

In addition to the manifold 20, the system 10 includes a gas evaluation device 40 incorporated into the components of the system 10. The gas evaluation device 40 can be used for evaluating fluids in the drilling mud, such as evaluating hydrocarbons (e.g., C1 to C10 or higher), non-hydrocarbon gases, carbon dioxide, nitrogen, aromatic hydrocarbons (e.g., benzene, toluene, ethyl benzene and xylene), or other gases or fluids of interest in drilling fluid. Accordingly, the device 40 can include a gas extraction device that uses a semi-permeable membrane to extract gas from the drilling mud for analysis. The system 10 can also use a multi-phase flow meter 30 in the flow line to assist in determining the make-up of the fluid. As will be appreciated, the multi-phase flow meter 30 can help model the flow in the drilling mud and provide quantitative results to refine the calculation of the gas concentration in the drilling mud.

Looking at a more comprehensive example of the drilling system 10 as shown in more detail in FIG. 1B, the control system 100 operates in conjunction with various hardware components of the controlled pressure drilling system 10, including the rotating control device (RCD) 12 and its equipment 102, riser gas handler (RGH) 15 and its equipment 105, managed pressure drilling (MPD) equipment 107, continuous flow system (CFS) equipment 109, pump(s) 60, flow diversion manifold 66, downhole isolation valve 19, the annular BOP 13, pressure relief systems, remote actuated valves, components for dual gradient operations, etc.

As also shown, the system 10 includes communication equipment 70, which can use the communications format of WITS (Wellsite Information Transfer Specification) for a variety of wellsite data items monitored and collected at the wellsite. This equipment 70 can obtain information about the drilling system 10 from the various sources, sensors, controls, etc. and can communicate them as needed throughout operations.

During operations, the riser gas handling equipment 12/105 operates to mitigate gas that develops in the riser (R), and the rotating control device 12 specifically closes the flow loop of drilling fluid. The MPD equipment 107 can be used for CBHP, PMCD, DGD, and returns flow control. As noted previously, the MPD equipment 107 includes the choke manifold (20), chokes (22), flow meter (24), and the like, and the equipment's flow detection components can detect kicks and fluid loss during drilling operations.

The continuous flow system (CFS) equipment 109 maintains a steady state of continuous flow for the drilling operation. For example, the CFS equipment 109 can be a sub-based system that allows flow to continue during drill-pipe connections while drilling and tripping out. A side circulation hose is routed to the rig floor, and a suspension device and clamp are placed on the rig floor. A flow control skid is positioned near the main mud flow line and integrated into the mud system to provide the continuous flow.

Working in combination with these pieces of equipment, the control system 100 operates in conjunction with various software components of the drilling system 10, including hydraulics, torque and drag, and geoscience software covering geomechanics and pore pressure prediction, and evaluation and prediction, etc. Together with these, the control system 100 offers a number of applications, including well monitoring, drilling, completion, automation, simulation, etc.

As will be discussed later, the control system 100 offers more than just an ability to perform automated managed pressure drilling (MPD) and other drilling functions. The control system 100 has the capability of integrating the functional requirements of the equipment installed on the rig for the purposes of MPD (sub-surface equipment through to topside equipment installation) from one common control system through one Intelligent Controls Unit (ICU) as dictated by the desired application—whether it be CBHP, PMCD, Returns Flow Control, Dual Gradient, or drilling with continuous flow.

To achieve this, the control system 100 is a central connection point/hub connected to other parts inside and outside the drilling system 10 with Internet connections, database transfer, control panels, WITS, sensors, actuators, etc. For example, the control system 100 ties the surface operating capabilities with the subsurface requirements as deemed necessary by the geological and drilling environment. More particularly, the control system 100 can perform pore pressure and fracture pressure prediction, provide analytical tools to determine torque and drag, and include a hydraulics module that allows the drilling engineer to simulate any hydraulic function that the wellbore 16 may be subjected to throughout its well construction life-cycle, including simulating kick dynamics among many others.

Ultimately, the control system 100 combines wellbore monitoring, measurement and control, integrates software functions with hardware controls, combines mechanical and fluid solutions, and provides predictive data and automated responses. The control system 100 allows data to be aggregated and decisions made based on both analytical and predictive algorithms. This capability to pre-engineer and simulate at the planning phase and then corroborate through real-time operations offers a way to conduct real-time diagnostics and post job analytics to optimize future drilling operations.

In the integrated control, the system 100 combines the components of flow detection, MPD equipment 107 (e.g., choke manifold), CFS equipment 109, rotating control device and equipment 12/102, and riser gas handler and equipment 15/105. Each of these may include its own local control unit, software, actuators, sensors, valves, flowlines, skid, etc., but the overall control system 100 integrates these components together and operates them in collaboration with the rest of the system 10. In the end, the control system 100 provides a universal drilling control function that combines hydraulics, geomechanics, fluid monitoring, and well control. The function can be used to automatically and manually measure and control certain drilling parameters such as flow, pressure, mud properties, and volumes. By combining geomechanical functions, the control system 100 can account for the geological complexity by aggregating data and providing more predictive data inclusive of wellbore stability.

The control system 100 can detect influxes, losses, gas at surface, and other events. For example, the following and similar events can be detected and identified by the control system 100: influx, kick, kick zones, loss, loss zones, pluggings (bit nozzle, chokes, etc.), ballooning, pump cavitation, choke cavitation, wash outs, formation changes, kick fluid, etc. These detected events, such as influx and loss, can have an automatic reaction option.

Preferably, the control system 100 uses a probabilistic approach to detect and identify such events. In this approach, the algorithms of the control system 100 detect events in steps and provide a probability that an event has been detected. This allows operators and the control system 100 to prioritize actions.

For example, the flow-out of the wellbore 16 may be detected as being greater than the flow-in. This may be due to several different reasons. The control system 100 initially warns the operators that a flow-out increase or anomaly is detected. Meanwhile, the control system 100 checks other parameters in a logical sequence (e.g., WITS data and other possible calculated values).

For instance, the control system 100 can determine whether the drillpipe 14 was moving when this anomaly occurred based on the WITS bit depth data. In another instance, the control system 100 can determine whether any ROP (Rate of penetration) increase has simultaneously occurred. After eliminating possible other alternatives, the control system 100 can then calculate a probability that an influx is occurring and can estimate the total gain. The control system 100 can then automatically take actions or may prompt the user for a particular action. Thus, in the control provided, selections to act can be obtained manually or can be computer-controlled with an automated sequence of steps or actions.

Once detection is verified, the software of the control system 100 can follow predefined steps to control a kick/influx and loss. The procedures/algorithms are composed of a number of steps/modes and have their own initiation and ending requirements. Although some common operations may be controlled automatically, the control system 100 still allows for user control. Some of the routine operations that can use automated control include Lost Circulation Material (LCM) squeeze, pill circulations, cementing operations (casing cement, balance cement), Dynamic Leak Off Test (LOT)/Formation Integrity Test (FIT), kick control, loss control, connection, and choke switch.

As described above, the control system 100 offers one platform to control the drilling operation from topside through bottomhole. As is known, planning and implementation of the drilling system 10 as in FIGS. 1A-1B require inputs from multiple parties, including geoscientists, drilling engineers, etc. For example, geoscientists investigate the formation and obtain seismic data, logs, core samples, and the like to characterize the formation. From that information, the drilling engineer develops the drilling plan, cementing operation, well barriers, BOP, well control requirements, etc. Being able to integrate information from geoscience, drilling, trajectory, well barriers, and the like in the control system 100 allows a more comprehensive well plan to be developed. As drilling then commences, required parameters can be monitored in real-time and used to update the engineering plan as needed to optimize the well plan and its execution. As will be appreciated, the overall plan for drilling the formation with the drilling assembly can use a great deal of information, models, operations, parameters, details, etc.

For example, the drilling engineer develops the primary well control barriers from the geoscience's formation characterization and then determines the secondary well control barriers (BOP) from that. Still, kicks may be encountered during drilling, and detection of the kicks can be monitored with the system 100 using algorithms, surface gas detector 40, and other elements. Yet, because the integrated control system 100 includes information about the formation, such as porosity, permeability, etc., the control system 100 can be used to anticipate kicks and may be used to determine the expected size, gas concentrations, and other characteristics of the kick.

As is also known, operation of the drilling system 10 as in FIGS. 1A-1B involves the cooperation of multiple parties, including the drilling contractor, operator, and service company, for example. Rather than having each of these parties use their own interfaces, controls, and the like, the integrated control system 100 can offer an integrated interface, which can be viewed on multiple panels by all parties.

Given the above context, the control system 100 provides just-in-time engineering that improves the decision making process in time sensitive scenarios by increasing awareness and decreasing reaction time, with the ability to aggregate, analyze and display relevant real-time information on panels on the rig floor and in remote operations centers.

The control system 100 employs real-time hydraulics, Torque and Drag (T&D), and Wellbore Stability (WBS) models. The control system 100 can control rig components, such as MPD choke manifold 20 and equipment 107, PRV, pumps 60, RCD equipment 12/102, CFS equipment 109, remote valves, etc.

The control system 100 enables real-time simulation, analysis, optimization, and visualization from the same platform. The system 100 collates real-time drilling data, combines those with manual inputs to create a virtual window into the downhole environment. Customized displays and 3D animations provide feedback on simulation results and process status. Pre-defined screens with targeted information provide instantaneous summary of conditions and parameters. The screens can have a format that works across multiple platforms and hardware, such as laptops, workstations, and mobile devices. The screens combine a suite of measured, interpreted, and simulated data that highlight critical areas of interest.

Contrary to what is shown in FIG. 1B, the drilling system 10 may not include all of these particular components and equipment. For example, the drilling system 10 may only include a riser gas handler 15 and equipment 105 and may not include components for managed pressure drilling or continuous flow. Yet, the control system 100 has all of the scalable functionality integrated into it, and the same control system 100 may be used for this downscaled system 10. Therefore, as components and equipment are added or removed from the drilling system 10, the functionality and capabilities of the integrated control system 100 can comparably match the changed configuration.

Should operators have a downscaled form of the drilling system 10 using the disclosed control system 100, the operators may at some point want to obtain updates or additional features of the drilling system 10 and/or control system 100. To handle this, a user interface questionnaire can be available in the control system 100 for the operator to present drilling and analysis needs they may have. Based on the needs, the control system 100 can offer a preset group of equipment, algorithms, models, services, etc. to meet the operator's needs and can produce a draft proposal for actually obtaining the equipment, algorithms, models, services, etc. To do this, the control system 100 can include a database containing information of available equipment, algorithms, models, services, etc. (e.g., RCDs, MPD manifolds, kick control algorithm(s), pore pressure prediction algorithm(s), personnel, etc.), and the control system 100 can use a decision tree to offer relevant packages of equipment, algorithms, models, services, etc. based on the operator's input (question-answer) about their current needs.

Figure 2A:
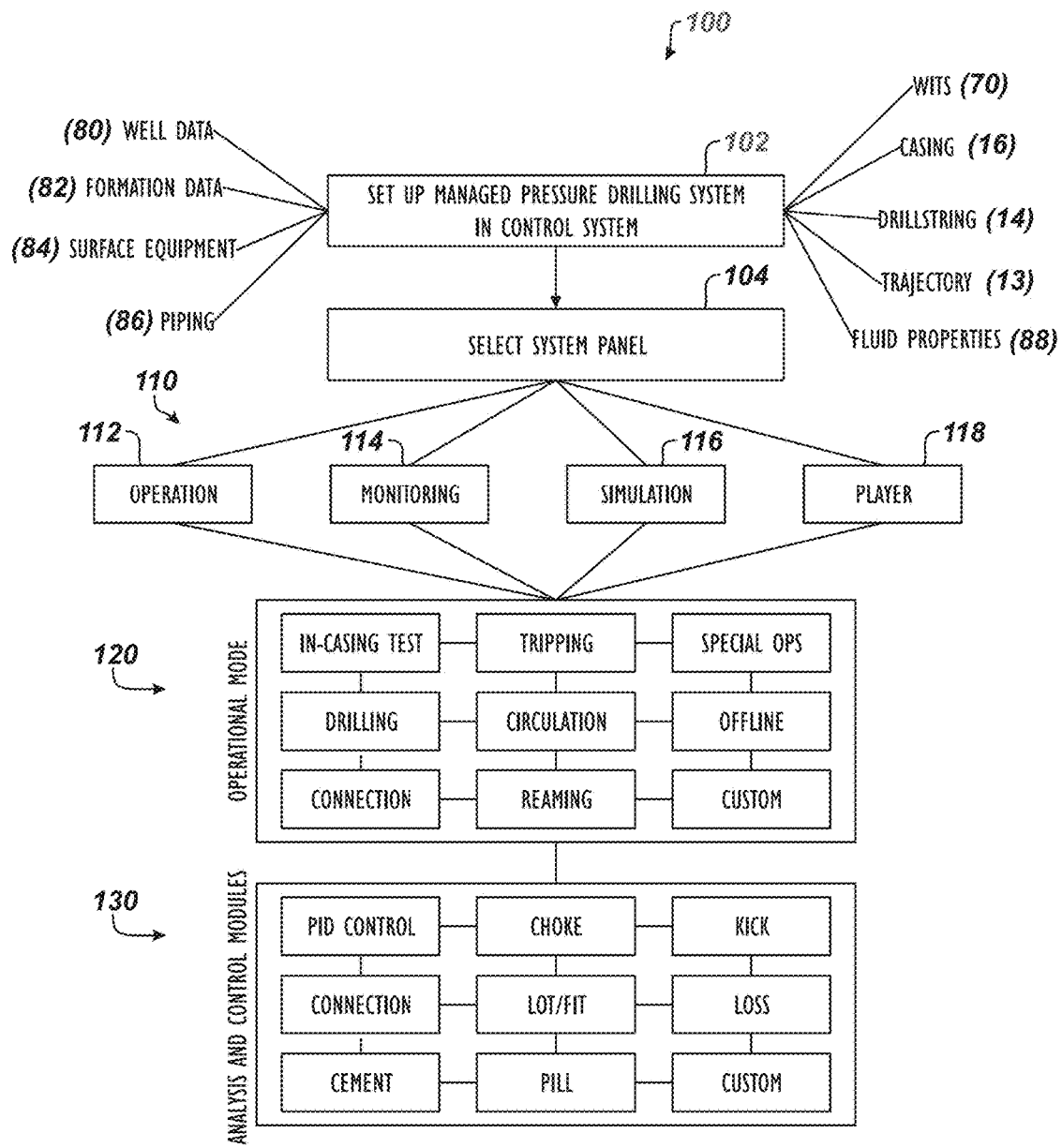
FIG. 2A shows a configuration of the disclosed control system.

A configuration of the control system 100 is shown in FIG. 2A. Using the computerized control system 100 with its user interfaces and its integration to the equipment of the drilling system 10, operators can configure a setup of the drilling system 10, formation, trajectory, drilling plan, etc. (Block 102). Comprehensive data is compiled and stored in the system 100 for later use. For example, operators obtain and input, import, etc. data pertaining to the well 80, the formation 82, surface equipment 84, piping 86, WITS data 70, casing 16, drillstring 14, drilling trajectory 13, fluid properties 88, etc. Various interfaces, such as discussed below, can be provided for incorporating this information into the control system 100. Moreover, during operations, the control system 100 integrates the setup with the drilling system so that operational data and information can be acquired for use by the system 100.

With the setup completed, operators can then select a system panel 110 in which to use the control system 100 (Block 104). These system panels 110 include an operation panel 112, a monitoring panel 114, a simulation panel 116, and a player panel 118. The operation panel 112 is used by an operator to control the managed pressure drilling operation in real time. In this way, the control system 100 can function in operational interaction with the setup using the integration of the setup with the drilling system 10.

Typically, only one operation panel 112 for an operator on the rig is allowed to operate at one time, although some forms of control and operation can be provided remotely as the case may be. In any event, the operation panel 112 allows the operator to control parameters of the managed pressure drilling system 10, review drilling parameters in real time, initiate analysis, conduct reaction steps to changes, etc. Various control interfaces, such as discussed below with reference to FIGS. 4-8, can be provided for conducting operations of the managed pressure drilling system 10.

Rather than operating the system 10, an operator can use the monitoring panel 114 to simply monitor the drilling operation. Much of the user interfaces and features provided for the operation panel 112 can also be available for the monitoring panel 114, but the operator is not strictly capable of controlling parameters of the managed pressure drilling system 10 when using the monitoring panel 114.

As its name implies, the simulation panel 116 allows the operator to simulate conditions, predict events, and project operations in the future based on the current data collected from operations. In this way, the control system 100 can simulate, at least for a time period, functioning in simulated interaction with the setup. Accordingly, the control system 100 can switch from an operating mode of the operation panel 112 to a simulating mode of the simulation panel 116 for simulated interaction with the setup, while current operations continue.

The simulated interactions (i.e., simulations) performed in this panel 116 can be conducted separate and apart from the actual operations conducted by the system 100 under the operation panel 112. However, operators can take the simulation results and accompanying instructions or recommendations from those results and can implement them automatically or manually to operational parameters in the operation panel 112.

Using various models and algorithms detailed later, the simulation panel 116 mimics the standard wellsite conditions and events. Operators can interact with full-scale equipment and flow loops in a simulated environment and can artificially inject wellbore events to test what-if scenarios and the like using the simulation panel 116. Various simulation interfaces, such as discussed below with reference to FIGS. 4-8, can be provided for simulating operation of the managed pressure drilling system 10.

The player panel 118 enables an operator to playback recorded data and logs and to review operations of the drilling and control systems 10 and 100. In this way, an operator can review operations by replaying past interaction with the setup.

In each of the system panels 110, the control system 100 can operate under one of several operational modes or operations 120. Some of the operational modes 120 include in-casing test, drilling, connection, tripping, circulation, reaming, special operations, and offline. These operational modes 120 comprise the main body of activity performed by operators and the system 100 during operations. In short, the operations at least include one or more of: an in-casing test operation, a drilling operation of performing drilling of a borehole, a connection operation of performing a connection of drillpipe, a tripping operation of tripping drillpipe out of the borehole, a circulation operation of circulating fluid in the borehole, a reaming operation of reaming the borehole, a well control operation of handling a kick or a loss while drilling the borehole, and an offline operation.

Depending on the circumstances, the operational modes 120 are manually selected by the operator and/or automatically selected by the system 100 based on the available data feed to the control system 100. For example, operators may be in the operation panel 112 conducting a drilling operation and may be using the control system 100 to control and operate the drilling system 10 as it drills the wellbore 16. Current operations, therefore, dictate this configuration of the modes during operations. However, the operator can switch to the simulation panel 116 and can use the current data feed to simulate a future operation, event, etc. (e.g., connection in the drilling process), even though current operations involve some existing operation (e.g., drilling).

As will be discussed later, results from the simulated connection can in turn be used as a guide or for comparison in the operation panel 112 as the next connection is eventually executed as part of the drilling process.

Finally, various analysis and control modules or controls 130 are available for the operational modes 120 and the system panels 110 of the control system 100. These control modules 130 can include, but are not limited to, a proportional gain (P) control, an integral time (I) control, a choke control, a connection control, a Leak Off Test (LOT), a Formation Integrity Test (FIT), a cement control, a pill circulation, a kick control, a loss control, and the like. Customizable control modules 130 can also be configured by operators in the control system 100 to achieve various purposes. These modules 130 can be used for Hydraulic Optimization, Wellbore Integrity and Quality, Well Conditioning Monitoring, Tripping Volume Management, Performance Analyses, Drilling Optimization, Kick detection, Loss detection, etc. The modular and extensible nature of the system 100 allows easy integration of additional modules 130. Various interfaces, such as discussed below, can be provided for analyzing and controlling operation of the managed pressure drilling system 10 using such modules 130.

Using these analysis and control modules 130, the control system 100 provides real-time analysis and drilling event predictions projected in the future. By combining measured pressures and other process outputs with their expected values, the control system 100 predicts drilling problems and events in the future before they manifest themselves in the drilling system 10 conducting the controlled pressure drilling in the formation according to the plan. For example, the control modules 130 of the system 100 can provide real-time hydraulics analyses and control using algorithms that include the effects of temperature and pressure on downhole fluid hydraulics. The simulation (modeling) can use additional techniques, such as pattern recognition for advanced kick detection, pore pressure (PP)/fracture gradient (FG), and borehole stability. The processing can use neural networks, smart agents, and event detection technologies.

The algorithms can include fully transient temperature and hole-cleaning models, PVT and fluid rheology models, and surge-swab models, among others. In particular, transient well hydraulics can provide fast-response models to handle rapidly changing flow conditions, such as pump and choke transients. For well control, the modules 130 can include early kick detection algorithms and associated well control equipment and automatic control processes. For surface hydraulics, the system 100 can model flow behavior and can be used for layout considerations and planning of the surface equipment. For drilling fluid properties, models can be used to account for the dramatic effect of temperature (low and high) and pressure on drilling fluid density and rheology. Displacement hydraulics models can be included to track fluid-fluid displacements including the effect of temperature and pressure on all displacement fluids in the wellbore at any point in time.

The control modules 130 of the system 100 can provide analysis and control of mechanical aspects as well. For BHA analyses, the modules 130 can include models for static and dynamic modeling of BHA vibrations. For torque and drag, the modules 130 can use soft-string and semi-stiff string models for torque and drag analyses in real-time. For casing centralization, the modules 130 can include casing centralization models using various standoff devices and centralizers. The modules 130 can determine drill string stress limits and warnings using models for drillstring stress limits and warnings to alert the operators. The modules 130 can use calculators and models for make-up torque, tool limits, torque-on-bit predictions, motor performance predictions, and pipe crush limits while in slips.

The control modules 130 of the system 100 can provide analysis and control of geoscience aspects. For pore pressure/fracture gradient prediction, the modules 130 can use pore pressure and fracture gradient models and techniques that operate in real-time using surface and downhole measurements. For wellbore stability and operating windows, the modules 130 can use real-time wellbore stability models for dynamic operating window updates and comparisons with downhole pressure profiles to determine wellbore instability risks.

The control modules 130 of the system 100 can provide analysis and control of real-time operation monitoring in a number of areas. For equivalent circulating density (ECD) vs drilling margin, the modules 130 can provide continuous and real-time comparison of downhole ECD profiles and operating window to ensure wellbore and well integrity. For real-time hole-cleaning, the modules 130 can provide a transient hole-cleaning model that simulates and tracks cuttings bed build-up. For displacements and fluid tracking, the modules 130 can provide a transient model that tracks fluid fronts during displacements and predicts downhole pressure profiles and surface equipment requirements using temperature and pressure-dependent density and rheology models. For fingerprinting volume changes (ballooning), the module 130 can fingerprint and monitor volume changes during connections and can provide instantaneous comparison with predicted values to catch anomalies. For pit gain/loss, the modules 130 can calculate expected thermally-induced volume changes during shut-in and connections to allow comparison with measured flow back to detect unexpected situations. Connection flow back can be synchronized in time with previous connections. For surge-swab pressures, the modules 130 can calculate surge-swab pressures in real-time in response to pipe movement.

The control modules 130 can perform event detection and determine trends for influx, loss, ballooning, lost circulation, connection gas, stuck pipe, twist off, buckling, fatigue, packoffs, inconsistent fill, lost returns, drag trend analysis (hook load, surface torque estimated vs actual), SPP modeling vs actual trend analysis, PWD modeling vs actual trend analysis, flow in/out (predicted vs actual), and surge/swab pressure vs bit depth (predicted vs actual). The modules 130 of the system 100 can also provide a multiphase well model. To do this, the modules 130 allow operators to set up and track multiple fluids in the drilling system 10 and to define loss/gain zones by tracking loss/gain with the flow meter. The modules 130 can use a single bubble approach to track influxes and can use empirical corrections for improperly calculated values.

The different operational modes or operations 120 call for different parameters for the controls in the analysis and control modules 130. For example, the steps used for automatically reacting to a "kick detection" during the "drilling" mode 120 will be different from the steps used for a "kick detection" during a "connection" mode 120. Reacting to the kick during drilling essentially requires moving the chokes with P (proportional gain) and I (Integral time) control to figure out a necessary amount of pressure to stop the inflow from the kick. By contrast, reacting to the kick during connection may require a complete shut-in and pressure recording.

The integrated setup and selections provided by the control system 100 allows operators to build a comprehensive database of the drilling system 10 and planned operations and to also define and use automatic and manual controls in the software and hardware of the drilling system 10 to control actual operations and to simulate simulated operations. As evidenced from the above discussion, the control system 100 provides an integrated platform for operation, monitoring, and optimizing (simulating and playback) of the drilling process.

The control system 100 allows operators to centrally plan, execute, and perform post job analysis in an integrated environment. Data is shared across the various system panels 110 and modes 120 to avoid data entry duplication so operators can focus on critical tasks. Sharing the same models across various panels 110 and modes 120 assures that the simulations are consistent and reliable. It also gives access to sophisticated tools for engineering analyses within the confines of a robust real-time operations control system.

The control system 100 can also be used with remote analysis and monitoring tools that can help transfer some wellsite responsibilities to remote operations centers and thereby help reduce number of personnel on the rig. It also helps remote personnel feel an integral part of operations by providing display and control screens that look, feel, and behave the same onsite or offsite.

Figure 2B:
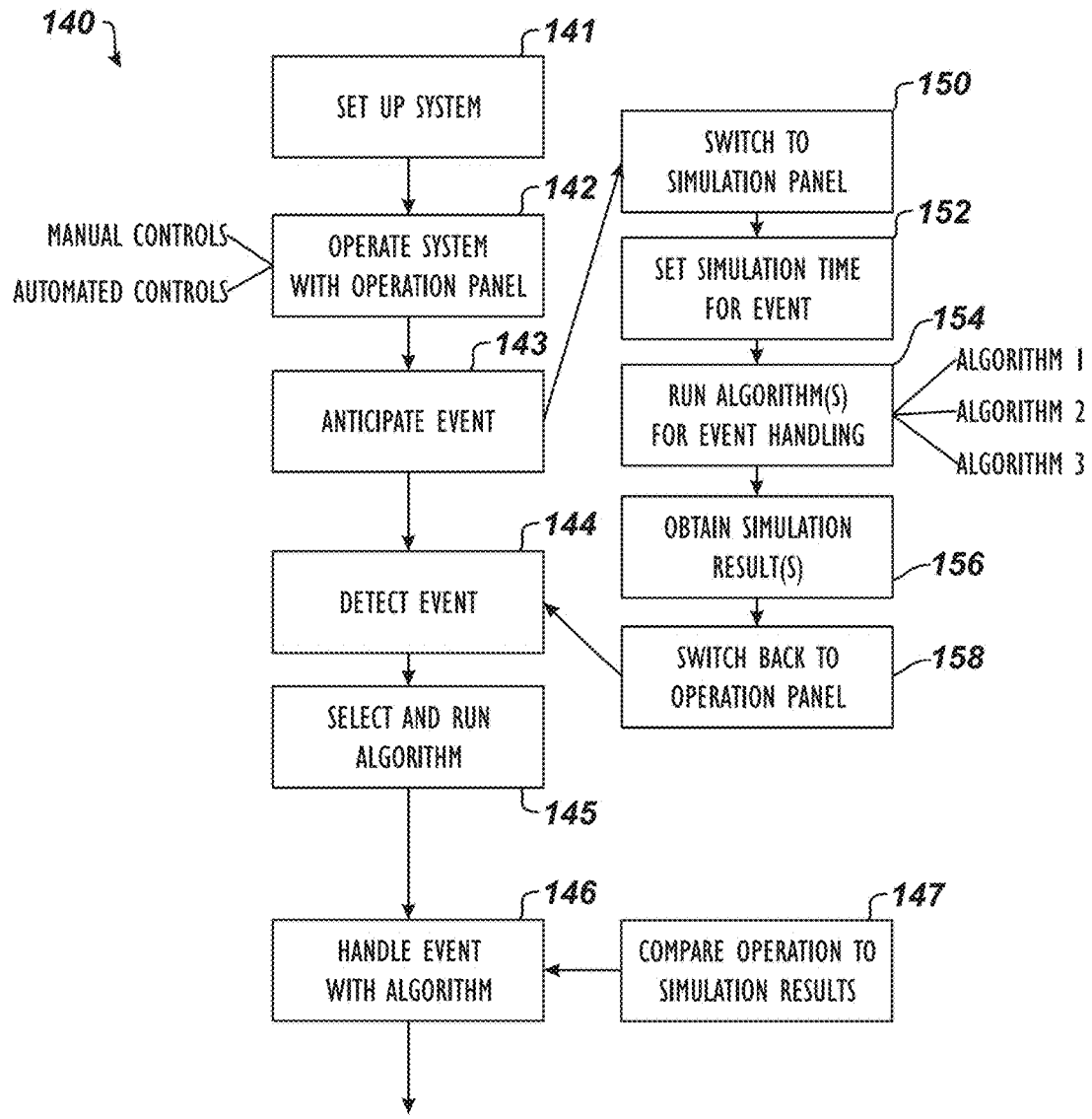
FIG. 2B shows an example process in which one or more operators may use the control system to operate a drilling system.

FIG. 2B shows an example process 140 in which one or more operators may use the control system 100 to operate the drilling system 10. As noted, the operators first set up all of the equipment of the system 10, details of the formation, casing, well data, drill string, geosciences, etc. (141). When drilling commences, the operators operate the drilling system 10 with the operation panel 112 using one or more manual and automated controls as the case may require (142). At some point, the operator may want to conduct a simulated operation that would be anticipated due to an issue or event, such as drilling into a particularly permeable zone of the formation, having to perform a difficult connection operation, expecting difficulty managing pressure, etc. (143). The operator can then switch to the simulation panel 116, or another operator may concurrently access the simulation panel 116 (150). Either way, operation of the drilling system 100 can still continue.

Using the simulation panel 116, the operator can indicate a simulated operation to simulate the functioning of the setup in a simulated mode of operation. In this way, the operator can analyze an anticipated event in the future. To handle forecasting, the operator can set a rate of how fast the simulation is to advance in time (152).

The operator then runs one or more algorithms or models for handling the simulated operation or event (154). The current drilling parameters from operation of the drilling system 10 can comprise the input parameters for the simulation. Multiple algorithms or models may be available to handle the same event, and each can be successively run or run together as processing allows. After running the simulations, the operator obtains simulation results from the algorithms and models (156). Based on these results, the operator may determine which of the algorithms and models more closely matches observed behavior and may help guide more efficient handling of the event.

After the simulation, the operators then switch back to the operational panel 112 (158). Should the previously anticipated operation be needed or the previously anticipated event be subsequently detected (144), then the operator in the operation panel 112 can select and run the algorithm or model according to the obtained simulation results (145).

This can be guided by the simulation results previously obtained, and the operators can import or control the running algorithm in light of the most likely simulation. The event can then be handled as operations continue (146), and at some point, the operators can compare actual operation results to the simulation results (147) for the selected algorithm or scenario. This can be used to further refine the algorithms and models, determine which is more effective, and the like.

B. Control System Architecture

Figure 3A:
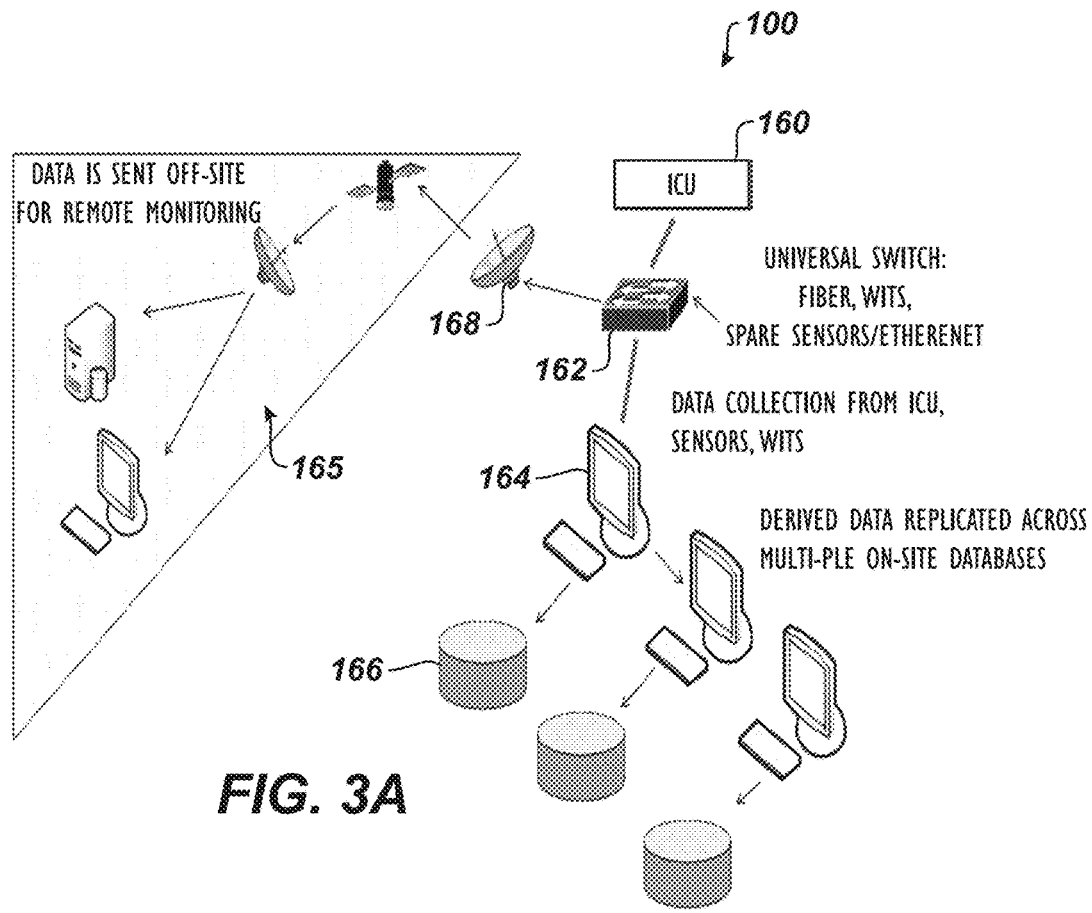
FIGS. 3A-3C show same architecture of the disclosed control system.

Turning to FIG. 3A, the architecture of the computerized control system 100 is schematically illustrated. The computerized control system 100 includes an integrated control unit 160, which can be a computer or server system having appropriate processing equipment, hardware, storage, and software. The control unit 160 connects with communication equipment or a universal switch 162, which interfaces with the equipment of the drilling system 10, such as sensors, actuators, local controllers, etc., using fiber connections, WITS (Wellsite Information Transfer Specification), spare sensors, Ethernet, etc. In this way, the control unit 160 is integrated with the drilling system's hardware to provide automation through integration of various rig hardware systems, such as pressure relief valve (PRV), managed pressure equipment, chokes, pumps, RCD, flow spool valves, annular BOP, diverter manifold, remotely controlled valves, DDV, CFS equipment, etc.

Using the communication equipment 162, the control unit 160 connects via satellite communications and relays data off-site for remote monitoring by an offsite computer system 165. Locally at the rig, the control unit 160 communicates with and between stations 164 and databases 166 accessible by the operators. These stations 164 operate the system panels (110) on-site for the various operators to operate and monitor the drilling system's operations, to run simulations, and to playback logged data.

Figure 3B:
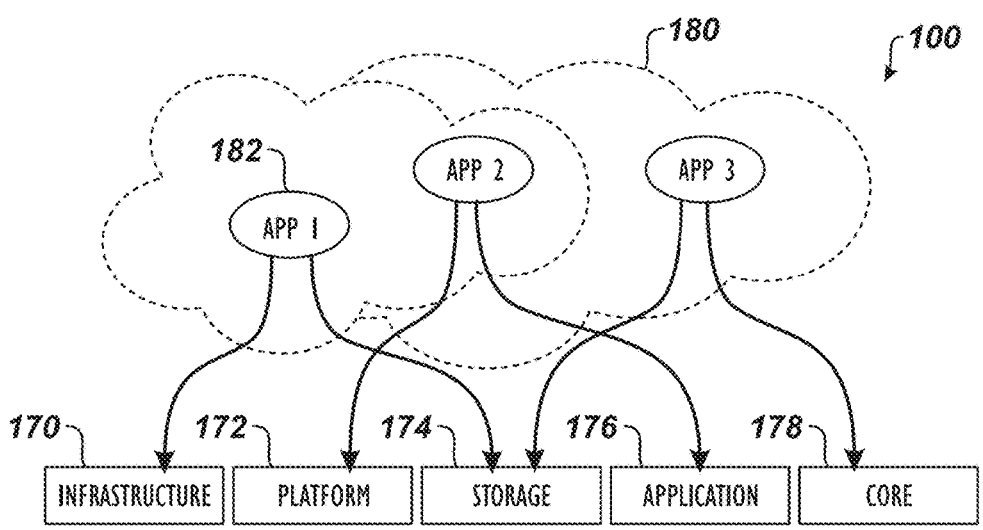

At a high level as shown in FIG. 3B, the control system 100 includes an infrastructure 170, a software platform 172, storage 174, applications 176, and core computing services 178. During use, the control system 100 can use a cloud-based environment 180 having various applications 182 to provide simulation, analysis, real-time visualization, etc. Additionally, the control system 100 can use the cloud-based environment 180 to provide process automation—preferably on limited, non-critical-paths. This arrangement allows the control system 100 and cloud-based applications 180 to be accessed not only locally at the rig but also remotely at one or more remote sites. The cloud computing can be based on a "Pay-per-use" and appropriate user-access and administrative rights model and can be independent of the user's hardware platform (laptop, tablet, smartphone). Additionally, there is no need to install certain computing features on the operator's own computers.

As the architecture shows, the control system 100 offers a single platform for simulations; operations control and automation; and real-time data management, visualization, and reporting. Access to the system 100 can be made on the rig, at an offsite office, or from other remote location. In this sense, the control system 100 can have a web module for real-time remote operation monitoring using a web browser. Operators can access historical data and can deploy applications, simulations, and the like using the disclosed cloud-based application environment.

Figure 3C:
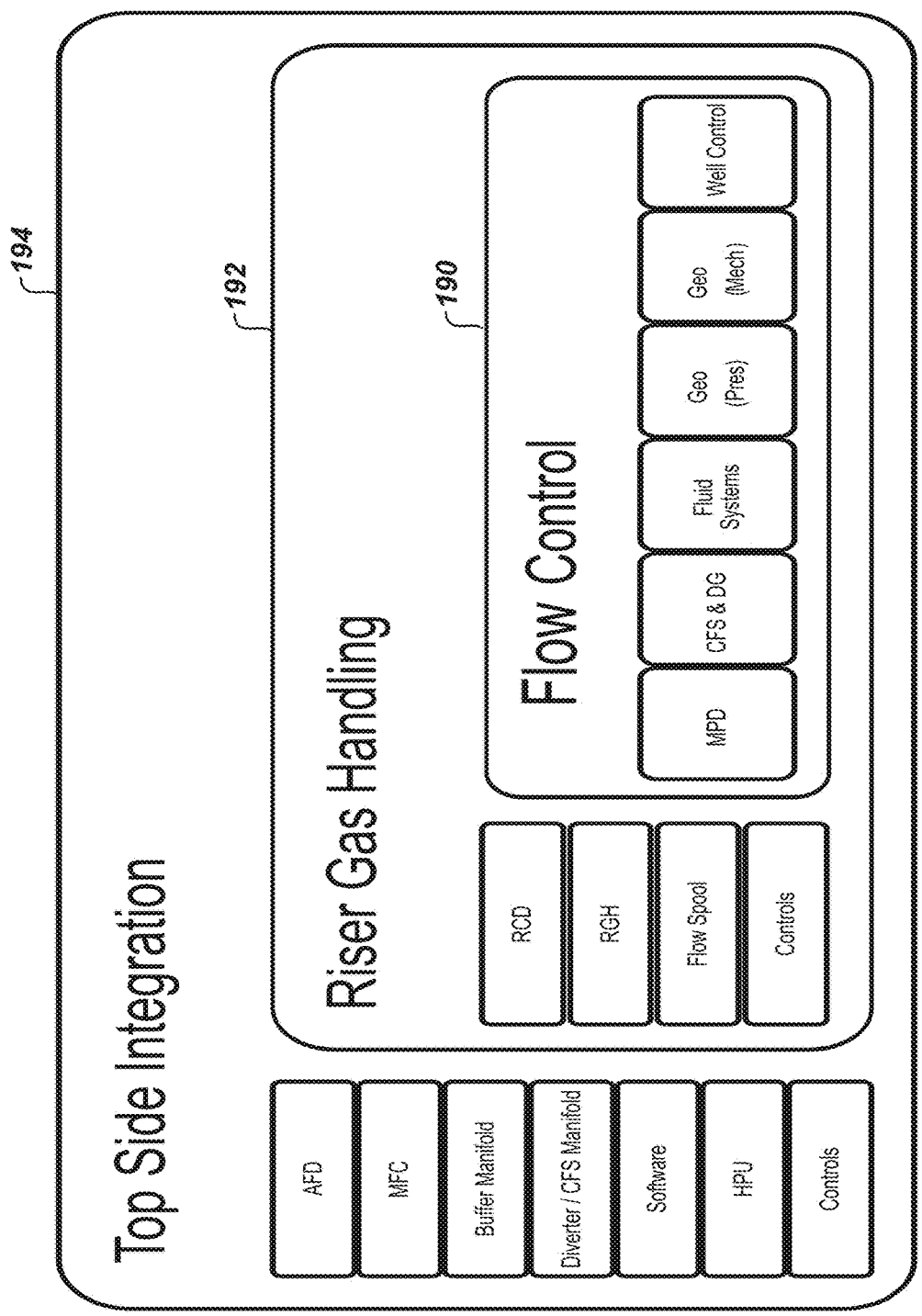

FIG. 3C illustrates how drilling-related operations are integrated in the disclosed control system 100. Flow control elements 190 are at the core of the disclosed system 100 and includes drilling-related operations, such as managed pressure drilling (MPD), continuous flow system (CFS), fluid systems, pressure-related geomechanics, mechanical-related geomechanics, and well control. These flow control elements 190 are integrated into the riser gas handling elements 192 of the drilling-related operations, which further includes the rotating control device (RCD), riser gas handling (RGH), flow spool, and gas handling controls. In turn, the riser gas handling elements 192 are integrated into the top side integration elements 194 of the disclosed control system 100, which include advanced flow detection (AFD), Microflux™ control system (MFC), buffer manifold, diverter/CFS manifold, software, hydraulic power unit (HPU), and topside controls.

C. User Interface

As noted previously, the disclosed control system 100 uses various user interfaces for operators to operate, control, monitor, simulate, playback, etc. the drilling system 10. As indicated in FIG. 2A, these user interfaces are organized into the system panels 110 of operation 112, monitoring 114, simulation 116, and player 118, which are provided in a user interface of the disclosed control system 100. By selecting between these system panels 100, operators can monitor, simulate, and control rig operations.

As discussed previously, the operation panel 112 is used by operators to control operations using designed control functions. The operation panel 112 is designated as a master panel and includes control functions for controlling the disclosed drilling system 10. This is the most visible part of the control system 100, and most of the interaction between the operator and the disclosed drilling system 10 takes place within the operation panel 112. For this reason, the panel 112 has features to assist the operator in his tasks, providing displays and features for the operator to retrieve information for specific sets of data.

The monitoring panel 114 allows operators to monitor well operations in real-time. The monitoring panel 114 shares all of the display features of the operation panel 112, but the monitoring panel 114 is intended only for viewing and monitoring operations and does not include control functions.

The simulation panel 116 can be used by operators to simulate well operations and conditions. Operators can use the simulation panel 116 to retrieve actual operational data retrospectively, to fast forward the system's simulations to simulate challenging conditions, and to rehearse remedial measures and control scenarios. The simulation (modeling) of the disclosed system 100 preferably covers modeling needs of multiple components, cementing, casing drilling, drilling tools, torque and drag, BHA analysis, well hydraulics, surface hydraulics, well control, drilling fluids, wellbore stability, pore pressure prediction, and fracture gradient prediction. Using these models, the disclosed simulation panel 116 can perform simulations for torque and drag, BHA analysis, real-time well hydraulics, transient well hydraulics, surface hydraulics, drilling fluids, well control, wellbore stability, pore pressure prediction, fracture gradient prediction, real-time operations analysis and reporting, real-time monitoring, etc.

Finally, the player panel 118 can be used to re-play recorded data, for training or incident investigation. In other words, the player panel 118 allows operators to play back multimedia records and well-states from rig operations for training and incident investigation. Playback can train operators about how physical events on the rig are represented in the various panel displays, charts, and messages. Playback can be used to investigate incidents, replay difficult scenarios, and make recommendations for future best practices.

1. Main Panel Screen

Figure 4:
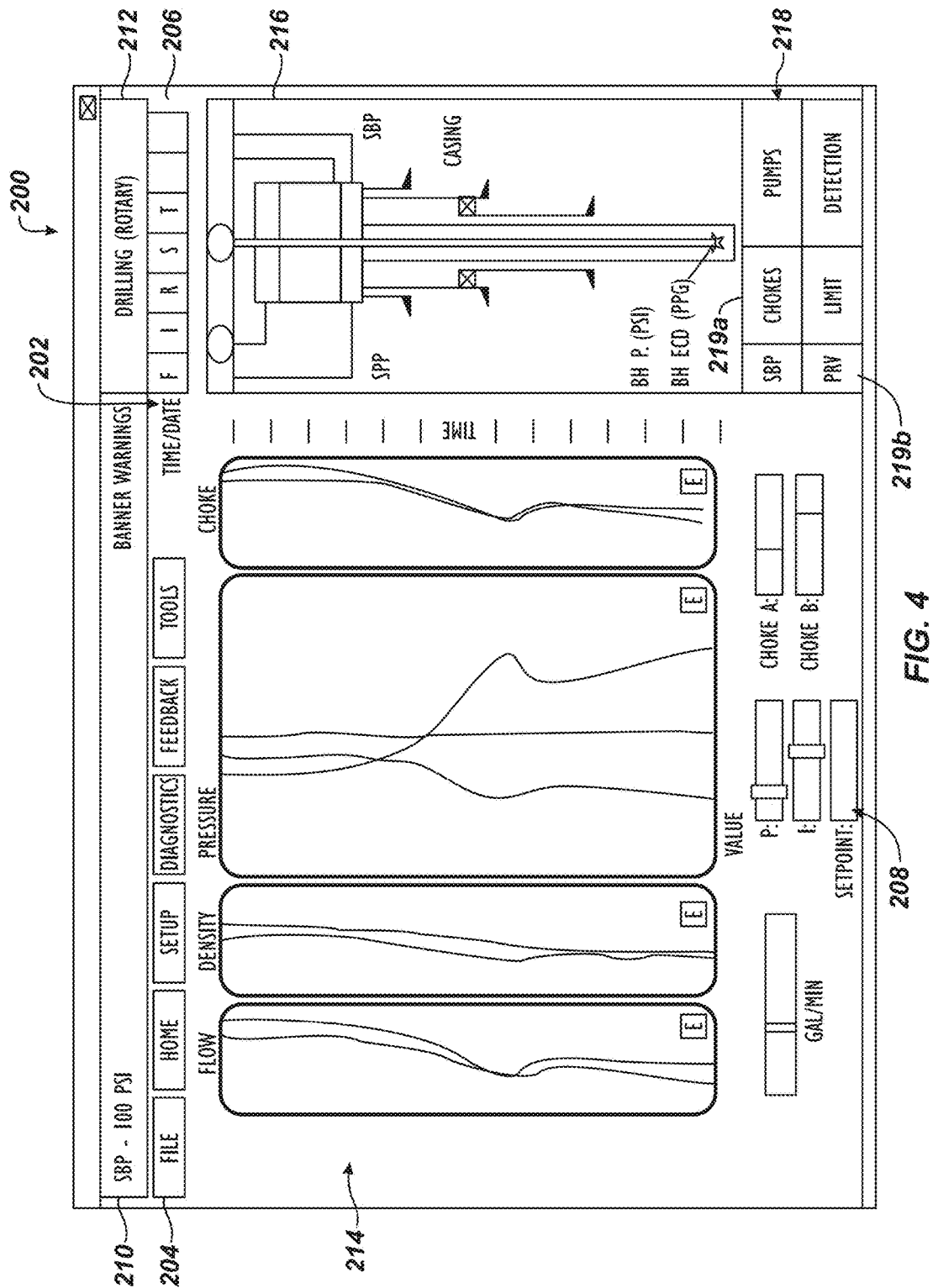
FIG. 4 shows an example a main panel screen for a user interface of the disclosed control system.

Selection of one of the system panels 110 brings the operator to a main user interface panel screen 200, such as depicted in FIG. 4. An icon 202 on the panel screen 200 shows which panel view has been selected from among the four panels (i.e., operation, monitoring, simulation, or player).

The panel screen 200 provides a visual interface to the control system's software for operators and engineers. The screen 200 has several areas including main banner 210, operational state banner 212, graph area 214, live well display 216, control panel 218, menu 204, and utility functions 206. The banner 210 indicates rig/well conditions and displays contextual alerts and features for the operator. For example, the main banner 210 can display a Warning Icon when a hardware or system problem is encountered.

The state banner 212 indicates the current operational status and changes depending on several defined rig operational modes (120), such as Offline, Drilling, Tripping, Connection, Special Operation (e.g., well control), etc. Clicking this banner 212 produces a drop down feature that allows the operator to select a particular rig operational mode (120). The detailed identification of well/operation status in this way allows the disclosed system 100 and operators to customize automatic reactions in time. For example, an automatic reaction to a kick during drilling when the rig pumps (60) are on will be different than an automatic reaction to a kick during connection. Moreover, identification and tracking of the operational modes (120) in this banner 212 will improve detection capability and eliminate false alarms based on what is expected during the different states.

In operational mode, the control system 100 collects and analyzes drilling data in true real-time (1 Hz or faster) and displays simulated and downhole hydraulics and other drilling related data. For example, the graph area 214 displays graphs or strip charts of useful well conditions, such as flow, density, pressure, choke, etc. The graphs in this area 214 can include time-based and depth-based graphs or profiles. In general, graphs for temperature, pressure, and density profiles can be available and saved into the database. Known and newly obtained or simulated pore pressure and fracture gradient values can be monitored and displayed with simulated ECD values. In fact, graphs in this area 214 can be added for any of the various measured, calculated, and WITS parameters.

The live well display 216 shows a schematic of the live well or the drillstring in operation, and the graphical information can help the operator to understand and analyze situations along the well. The live well display 216 can vary from the time and depth based graphs in the graph area. The live well display 216 can be presented as trajectory or three types of well schematic views (i.e., sketch, diagram, and engineering). For the trajectory view, the live well display 216 can show a schematic of the rig and drill trajectory, indicating location of casing and other components. Fluids in the live well display 216 can be color coded for distinction, and color gradations can be used to indicate variable mud weight.

Various data can be provided in the live well display 216. Some examples of the displayed data can include surface back pressure (SBP), stand pipe pressure (SPP), bottom hole pressure (BHP), bottom hole temperature (BHT), mud weight in and out, mud temperature in and out, rotary kelly bushing (datum line), RCD, Riser, BOP, kill choke lines with valves, boosting line, RCD line with valves, casing string, drill string, pressure-temperature-ECD at observation points, fracture animation, kick/loss indication with arrows, circulation direction (i.e., normal vs. reverse circulation), etc.

In the live well display 216, major downhole equipment and components can be displayed (e.g., casing string, drillstring, packers, plugs, valves, kick/loss zones, perforations, etc.), and certain surface equipment (e.g., RCD, Riser, BOP) can also be displayed. The profile of the wellbore can be available with simplified tracking as a second (back page) for quick reference. Depending on which panel selection has been made or on user-preferences, certain measured WITS and calculated data may be available through selected observation points in the live well display 216.

Additionally, multiple fluids can be tracked with combined effect on Bottom Hole pressure/ECD (Equivalent Circulating Density). In this regard, the panel screen 200 provides a fluid offset input. This fluid offset allows the operating engineer to match fluids in the hydraulic model to actual well conditions by manually offsetting fluid positions in case pumping a different fluid into the drill string was not timely measured and updated in the system.

As noted above, the panel screen 200 indicates the current, active panel with an icon 202, such as operation, simulation, monitoring, or playback panel. When operating under the operation panel, for example, the operator can control rig operations using controls in a control panel 218. When operating under the simulation panel, however, the same controls are available in the control panel 218, but these are used to simulate control of the rig operations or simulate sensor measurements. Certain controls may or may not be available for the monitoring and playback panels.

The utility functions 206 provide additional information to the operator. An Action/Start button (F) allows the operator to initiate a predefined activity such as pumping fluids, and offset mud-pumping time. An instant information (I) provides the operator with the ability to view and input all parameters manually, where necessary, according to five categories: counters, hydraulics, sensors, volumes, and WITS. These functions can be used to overwrite an input in the event of a sensor or WITS failure and is useful in the simulation panel when sensor and WITS data may not be available.

As shown in FIG. 4, set point controls 208 can be provided for a number of parameters, such as SBP, SPP, annular pressure (AP), and flow control. Choke, PRV, RCD, remote controlled valves, continuous flow system, diverting manifolds, downhole deployment valves, and similar components can have controls in the control panel 218 and set point controls 208. If needed, the system 100 can automatically determine and regulate surface equipment set points needed to control events and operations.

As shown in FIG. 4, the controls in the control area 218 display information for key parameters, such as managed pressure drilling (MPD) controls, chokes, pressure relief valve (PRV), and detection and SBP high limit in the operation panel. Additional controls can be used for the integrated operations to control mud pumps, auxiliary pumps, RCD, DDV, remote valves, CFS, diverter manifold, etc. When the panel screen 200 is operated under simulation, the control panel 218 can have additional features for pumps, strokes per minute, and the like.

As noted above, the controls in the control panel 218 provide controls for pressure, chokes, PRV, and the like. For pressure control, for example, the control can provide flow data and numerical controls for controlling the choke based on proportional gain (P) and interval time (I). Comparable P-I controls can accompany pressure controls for SBP, SPP, annular pressure, etc.

To control surface back pressure (SBP), for example, the controls for the disclosed system 100 can maintain a constant SBP once a set point is entered by the operator. The choke position is adjusted (opened/closed) to achieve the desired surface back pressure with the help of built-in P-I controls. This direct pressure control in the system 100 can use pressure gauge readings at surface.

Controls can also control using stand pipe pressure (SPP). Similar to the SBP control, the system 100 can use pressure gauge readings as a reference to adjust the choke's position and maintain the desired pressure. Hydraulic delay plays a role in SPP control, and choke movements create additional pressure pulses that take time to be transferred from the choke to the stand pipe (e.g., 2-sec/1000-ft). Total travel time (or time delay) depends on fluid compressibility and distance to travel. Therefore, the SPP control is preferably performed incrementally to minimize unwanted pressure oscillations.

Controls can also control Annular Pressure (AP). This control differs from the SBP and SPP controls because the AP control is based on hydraulic models. Instead of using pressure gauge readings, this control uses model calculations to adjust the choke's position. The AP control is driven by a Bottom Hole Pressure (BHP) control and makes it possible to control the annular pressure profile at any depth to a preset value.

A connection control can be provided as part of the MPD functions and can allow the operator to edit or change values for connections. Also, a flow control allows the operator to set a gain (+) or loss (−) for the flow. In Pressurized Mud Cap Drilling (PMCD) applications, for example, when bullheading is required to push the formation gas back into the formation, the flow control of the disclosed system 100 can be set to a constant loss rate, and the chokes can be moved to maintain a set pressure. When the well is under-balanced, a constant formation flow into the wellbore can also be maintained depending on operational requirements.

A choke position control can control the two chokes (Choke A and Choke B) on the system's choke manifold used to control pressure of the drilling system 10 individually or both at the same time. The chokes are operated by the controls using set point controls and other inputs. The choke position control is not necessarily intended to control pressure during drilling since MPD controls may control the chokes to manage pressure. Rather, the choke position control provides the operators some flexibility to bring the chokes to a certain position for testing or maintenance. This control can also give the operator the ability to override and take the control of the choke positions from the control system 100 in certain cases.

The control system 100 allows the operators in the operation and simulation panels to modify a number of equipment controls, such as Default—WITS, P-I controls, manual choke controls, choke controls, pump controls (e.g., Stroke Numbers from stroke counters or manually entered in simulation panel, and Pump Throttles), and the like.

The control system 100 also allows the operators in the operation and simulation panels the ability to modify a number of set points for various controls, including, but not limited to, the flow control (e.g., loss set point, gain set point), the SBP control (e.g., SBP set point, P & I parameters, automation), the SPP control (e.g., SPP set point, P &

I parameter, automation), AP control (e.g., BHP set point, depth entry, P & I parameters, automation).

The choke controls 219 can offer three options for both chokes. An auto option can be used by the control system 100 to control set points, and a manual option can be used by the operator to control the choke position. An off option can be used when the chokes need to be disabled. MPD controls in the control panel 218 can adjust the P and I control values for MPD variables, such as SPP, SBP, Flow, connection, etc.

The control panel 218 can include Pressure Relief Valve controls 219b, which are enabled during set up of the equipment configuration. The pressure relief valve is designed to protect surface equipment according to defined operating limits, and the pressure relief valve opens to release the pressure when the pressure is higher than a set point.

The Pressure Relief valve control 219b has three operating options. In an internal option, the pressure relief valve uses a local (PRV) pressure sensor for its control signal. In an external option, the pressure relief valve uses a surface back pressure sensor for its control signal. In a disabled option, the valve is controlled by an offset. If the pressure increases above a specific control point (i.e., another control's set point), then the pressure release valve will open temporarily to control the pressure overshoot releasing the pressure and closing again. For these options, the P-I parameters are automatically adjusted by the system 100 to stabilize pressure around the set point.

D. Setup Procedures

As noted above with reference to FIG. 2A, operators use the control system 100 to set up data of the drilling system 10, the well 16, the formation F, surface equipment, piping, WITS, casing, drillstring 14, drilling trajectory, fluid properties, etc. Setup or configuration of a new well project can only be done using the operation or simulation panels 112 and 116. Initially, operators can setup information in the control system 100 about a job (drilling project) by providing a project name, Project ID, Lease, Well Name/Number, etc. The job type can also be setup and can include Well Monitoring, CBHP (Constant bottom Hole Pressure), Mud Cap, Dual Gradient, UBD (Under Balanced Drilling), Performance Drilling, Completion, and the like.

Once a project has been established, operators can set up different elements of the disclosed system 10. Various set up interfaces for configuring these elements can be provided.

1. Surface Equipment Setup

For example, various setup screens can be provided for setting up surface equipment, piping, and instrumentation for the disclosed drilling system 10. Using these screens, operators configure the various surface and subsea components by entering the component's parameters, piping connections, etc. Based on the set up, the control system 100 can then determine relevant frictional pressures, time delays, and other variables from the configuration, flow paths, and parameters so that the control system 100 can calculate parameters with more precision during operations, monitoring, and simulation.

For example, operators can set up the equipment configuration for the drilling system 10 using equipment configuration screens. The entire configuration can be set up manually and/or imported into the system 100, and piping and instrumentation selections can be made available based on the equipment selections. This allows the well model in the system 100 to calculate proper frictional pressures through alternative flow paths.

Equipment selections are accompanied by equipment specifications where parameters, models, types, and the like can be populated and altered as needed. Some example equipment selections are provided here. Rig Type can be defined as Land Rig, Jack Up, Floater, Fixed Platform, Compliant Tower, Drill Ship, etc. BOP (Blow Out Preventer) can be defined as Surface BOP Stack or Subsea BOP Stack. The models and types of equipment include RCD, MFCS manifold, flow meter, MFCS chokes, auxiliary pump, rig pump, MGS (Mud Gas Separator), CFS (Continuous Circulation System), gas evaluation device (i.e., GC—Tracer), diverter manifold, heave compensator, trip tank, riser degasser, PRV (pressure relieve valve located upstream of the choke), junk catcher, line up through rig choke (rigging up through rig choke enables the ability to monitor/control flow/control pressure when BOP is closed), emergency shutdown, etc.

As noted above, piping and instrumentation is set up in the control system 100. For example, a visual depicting the configuration of the piping and instrumentation is provided based on the equipment configuration selections, drag and drop operations, and the like being made during set up. The visual shows how the equipment lines up and shows the flow directions. Reverse circulation through kill line/RCD fill-up line are supported by the well model, which is controlled by open/close valves and pump line up. Piping size, sensors, alternative flow loops, and the like are also stored and shown.

Because the equipment can be input during set up and operation of the equipment can be logged, the control system 100 can track various pieces of equipment for maintenance and replacement, flow rates, total flow, flow velocities, flow composition, total usage, or other factors. For example, particular equipment that can be tracked include the choke (i.e., its seats, gates, O-rings, etc.), the flow meter, piping, the RCD (i.e., bearing assembly, rubbers, etc.), DDV, HPU (i.e., hydropower unit, solenoid valves, hydraulic hoses, pumps), etc.

2. Well Data Setup

Selections for setup include areas for information on formations, survey, casing, drillstring, and temperatures. For example, various setup interfaces can be provided for entering well data related to formations, survey, casing, drillstring, and temperatures. The well data allows the control system 100 to have detailed formation, survey, casing, drillstring, and temperature data for live well support. The casing and drillstring data can be catalog-based to maintain data quality. The detailed data for the formation can include parameters such as porosity and permeability needed to define and simulate kick/loss scenarios.

a. Formation Data Setup

To setup formation data, geological information about the formations is entered into the system for use during operations and simulations. The formations data identifies the characteristics of the various formation layers, starting at the surface, moving down hole towards the bottom.

Various pieces of information about the downhole formations can be entered, including a zone characteristic (Kick/Loss/Neutral), formation properties, porosity, permeability, depth, pore pressure gradient, wellbore stability gradient, fracture pressure gradient, geothermal gradient, lithology, LOT/FIT, casing shoe depth, maximum allowable annular surface pressure, surface temperature (Earth/Sea if offshore), BHT (Bottom Hole Temperature), etc. If some of this information is available through WITS, the control system 100 can assume a linear profile through formation with a constant gradient.

b. Survey Data Setup

To setup survey data, the data can be entered manually or uploaded from another source. This survey data can include various parameters of a survey, including Measured Depth, Inclination, Azimuth, True Vertical Depth, Dogleg Severity, etc. The first line of the survey always has a zero value or datum line since this is the Kelly bushing level.

The survey data builds the three dimensional trajectory of the well. For example, a well trajectory can be displayed relative to a live well by using entered survey data.

c. Casing Data Setup

To setup casing data of the casing sections lining the borehole, starting at the surface with the largest diameter and continuing down, the casing data is entered in depth order by entering casing types and defining parameters, such as outer diameter, nominal weight, hanger depth, set depth, length, etc.

Other elements and components disposed on the casing are also entered in the setup. Some of these other elements include DDV, DV used in Casing Cement Operations, Packers, Plugs Perforations, etc. Because the setting depth and length of these elements are specified, the control system will know what is the possible circulation path for a drillstring so pressures can be calculated accordingly.

d. Drill String Setup

To setup drillstring data for the drilling system, information on the drillstring is entered during set up, including, for example, bit, drill collar, HWDP (Heavy Weight Drill Pipe), Tubing, Coiled Tubing, Under Reamer, Mud Motor, Stabilizer, Jar, cross over, Float Valve, I-BOP (Inside BOP), safety Valve, Packers, DST Tools and similar components running in/out of the well through Drill String/Tubing. The drillstring is made up of drillpipe, drill collars, and a number of additional components that connect the surface systems to the drill bit. In addition to drillpipe and drill collar, other drilling components that can be entered in the drillstring data includes bit type (e.g., roller cone bit, Button or Tungsten Carbide Insert (TCI) bit, drag bit, PDC bit, core-head bit, etc.), under-reamer, stabilizer, etc. Data of the drillpipe and components can be input and imported into a drillstring table. Several drillstring configurations can be defined for the same project.

As is known, the drillpipe provides a conduit from the surface to the bit so the drilling fluid can be conducted under pressure. Additionally, the drillpipe transmits rotation at surface to the bit and transmits force or weight to the bit. Entering parameters of the drillpipes making up the drillstring in this manner can be used in modeling, simulation, and analysis.

3. Fluid Properties Setup

In additional setup, the control system 100 can be used to set up fluid properties for the drilling system 10. For instance, drilling operations use various types of fluids such as mud, brine, and cement. Selection of the fluid systems depend on the formations to be drilled, drilling equipment, as well as the mixing and maintenance costs. Additionally, different drilling techniques call for different fluids and properties.

In underbalanced drilling, for example, the wellbore pressure is below the formation pressure, and the well is continuously flowing during drilling. Therefore, light weight fluids such as air, gassified liquid, air/water mixtures, and foam are used. In overbalanced drilling, including Managed Pressure Drilling (MPD), many kinds of drilling mud are used. The drilling operation uses many kinds of special fluids for each phase of the project like drilling, cementing, and completion.

In overbalanced drilling, for example, the primary functions of the drilling fluids are to create a hydrostatic head, maintain wellbore stability, transport cuttings to the surface, cool the bit, and create buoyancy for the drillstring. Mud properties play an important role for the entire drilling activity and in particular for wellbore pressure profile management.

To handle the various types of fluid involved in the drilling operations, the control system 100 allows the operator to configure and select different types of fluids. In this way, using the control system 100, multiple fluids can be defined with their rheology, such as Pill, LCM, cement slurry, etc. The control system 100 has a built in hydraulic model to manage the wellbore pressure profile using inputs of these drilling fluid properties. Based on the fluid properties, for example, the control system 100 can calculate the resultant BHP and ECD values among other relevant parameters. The control system 100 can also track the multiple fluids in the well and provide a better understanding of the well's state.

To enter fluid properties, information about the fluid properties for mud, brine, and cement in the drilling system 10 can be entered into the control system 100. Brine and cements are significantly different from drilling mud, and they are grouped under separate headings. Brine is mostly used for well completion, and cement has particular applications during various cementing operations.

Looking at the setup for fluid properties of mud in the system as an example, an active "Mud Type Selection" can be made, and all known parameters can be populated and then modified as needed. All other fluids (pills, cement slurries, influxes) can use the same approach. As mud properties are changed on daily basis, updates are done accordingly.

Some parameters associated with the mud can include mud type (water, water-based mud, oil-based mud, and synthetic-based mud), mud weight in, dial readings, Gel times, reference temperature, reference pressure, volume (i.e., the total volume in the well calculated and updated automatically as well is drilled deeper), salt type, salinity, API fluid loss, HTHP fluid loss, API cake, pH, mud temperature in, retort oil %, retort water %, thermal conductivity, specific heat capacity, rheological model, loss circulation material, Hi-Vis pills, any type of slugs and spacers, cement slurry, etc. Even types of influx fluid (gas, oil, water, etc.) and the parameters (density, volume, intensity, kick composition, maximum expected surface back pressure, expected gas circulation time, etc.) for influxes can be entered based on the available formation information.

During analysis, monitoring, simulation and the like, the control system 100 may automatically assume that mud or other fluid in the well is defined by the given properties. If a new mud or fluid is going to be pumped for any reason, new fluid with new properties can be defined by the operator in the interface of the control system 100 so multiple fluid systems can coexist in the same well.

4. Limits and Alarms

Setup can be used for inputting limits and alarm for the control system 100. The limits can be default or user-defined limits and can pertain to sensor parameters, hydraulic parameters, and WITS parameters. Limits and alarms can be set up for various measured parameters (e.g., SBP, SPP, flow in, flow out, density out, mud temperature out, etc.), calculated parameters (e.g., flow velocity, total mass flow, total time, erosion, friction, etc.), and WITS Parameters (e.g., ROP, block height, pit gain/loss, active tank volume, trip tank volume, gas units, etc.)

Once a value exceeds the limit or an unexpected behavior is recognized, the control system can alarm operators through a banner message or other user interface element. These limits and alarms can be used mainly for identifying an early stage of a developing event which may be detected and identified by the control system later during operations. For example, a flow increase of a certain magnitude is one of the signs of kick event. Yet, at an initial stage of detection, the increased flow will only be informative, and no automatic action needs to be taken by the system. In this sense, the limits and alarms can keep operators informed.

Eventually, detection and identification of a complex event using detection algorithms can start after these easily recognized changes. Thus, the control system 100 preferably runs certain analysis and checks for other changes to eliminate detection errors. Only after the control system 100 reaches a percentage of certainty will the system identified the occurrence of a complex event, such as a kick. Once a kick or other such event is detected, the operator can immediately switch into the well control mode on the main panel screen 200.

5. Engineering Features

An engineering menu screen can be accessed to provide operators access to analysis, calculations, and simulations both onsite and offsite. When these features are accessed, the control system 100 uses the current data automatically as the needed input to perform the selected form of analysis, calculation, and simulation.

The calculations can include various types of straightforward calculations and number crunching, such as ramp calculations of flow relative to pressures, well-at-depth, and a rollover change in fluids in the drilling operation. The analysis can also include more sophisticated calculations and determinations. The simulation can include simulations of events, scenarios, and operations before they occur, as they occur, or after they occur during post-processing diagnostic analysis.

Using the simulations, for example, the operators can simulate and troubleshoot various conditions using different models and project them in the future as a guide to existing or expected events, scenarios, and operations in the current drilling operations. By running "what if" scenarios, for example, operators can prepare for sensitive operations. For example, the operator can simulate a whole cement operation of the wellbore before monitoring the actual event, including comparing the planned vs actual scenarios. An example simulation can include the simulation of a kick/loss event, which is disclosed in more detail later.

E. Models and Control Algorithms

As disclosed herein, the control system 100 uses a number of models and algorithms for detection, control, monitoring, and simulation. Some of these models and algorithms include a hydraulics model, P-I control model, control algorithms, kick/loss algorithms, and the like. Details of some of these are discussed below.

1. Hydraulics Model

The control system 100 uses a hydraulics model to calculate parameters to provide the operator with alerts as the drilling operation proceeds. A primary function of a hydraulics model is to calculate downhole and surface pressures during operations. The formation exerts pressure on the wellbore, which is counteracted by the drilling fluid that circulates throughout the wellbore. Therefore, maintaining the appropriate downhole pressure is essential to maintain integrity during any wellbore operation.

The hydraulics model is a numerical framework that can use a coupled temperature and pressure-dependent hydraulics model and a temperature distribution model. The temperature distribution model calculates temperature distributions in the pipe and annulus, and is based on geothermal gradient, temperature in, flow conditions, and drillstring spatial conditions, and is affected by additional downhole heat sources and sinks, such as frictional pressure loss. In turn, the resultant pressure from the pressure module depends on temperature, as well as the compressibility and thermal expansivity of the mud, and thermal and pressure effects on mud rheology.

The hydraulics model accounts for formation fluids, drilling fluids, temperature distribution, etc. The formation surrounding the wellbore contains the formation fluids that exert pressure on the wellbore. If the formation pressure is greater than the pressure exerted by the drilling fluid, formation fluids will flow into the wellbore. However, if the drilling fluid's pressure is too high, the formation will fracture, drilling fluid will flow into the formation, and annular sections of the wellbore may collapse. Therefore, the fluid's pressure is preferably modelled to be greater than the formation pressure, but less than the formation's fracture gradient pressure.

The hydraulics model accounts for the hydrostatic pressure exerted by the drilling fluid. Hydrostatic pressure is caused by the effects of gravity on the drilling fluid's mass. It is primarily affected by the downhole fluid density and true vertical depth (TVD) at a particular point in the well. Hydrostatic pressure increases with depth and as the density of the drilling fluid increases.

The hydraulics model accounts for the frictional pressure losses resulting from the friction created by fluid layers rubbing against the walls of the pipe and annulus. For the fluid to circulate, the mud pumps must have sufficient hydraulic horsepower to overcome the pressure losses throughout the drilling system. Factors such as viscosity, fluid location, and flow regime significantly influence frictional pressure loss. Additional pressure loss is caused by geometry changes, pipe rotation, flow through the nozzles of the bit, as well as swab and surge due to tripping operations, etc., among others.

2. Control Algorithms

As shown in FIG. 2B, the control system 100 includes control algorithms to define parameters for automated and semi-automated functions. These can be the algorithms used, for example, when the control system 100 automatically reacts to (or simulates reaction to) an event (kick, loss, etc.) or when a user initiates a standard operation. For example, automated functions in the system 100 can include a kick control algorithm and a loss control algorithm. The operational sequence of these algorithms can be defined as a sequence of steps, decision, and actions. Unless an operator does not interrupt this sequence, the control system 100 can follow all steps based on default or pre-defined parameters.

Visual representations of algorithms used by the control system 100 can be shown in control algorithm screens. These can be displayed to the operator in the user interface of the system 100 and represent simplifications of the process steps of the algorithms actually embodied in the software of the control system 100.

As shown, the various decision-making parameters and sequence of decisions can be displayed in an algorithm flow chart so the operator can understand which mode/step the control system 100 is following at the moment. Certain parameters of the algorithm may allow for operator adjustment and refinements. Ultimately, the operator can take control of the sequence and can give control back to the control system 100 any time by selecting the mode on main panel screen (200).

Function of the control algorithms can be controlled with the "START/STOP" function (206) on main panel screen (200). For example, a kick detected by the system 100 may be automatically controlled at first. The operator may then decide to take control for any reason. After the operator achieves the goal with available controls (Pressure Set Point/Fluid Set Point/Choke Control) in the control panel (218) of the main panel screen, the operator can instruct the control system 100 to complete the remaining modes/steps of the control algorithm.

One type of control algorithm can be for a kick, and another type of control algorithm may be for a loss. As is known, a "kick" is the entry of formation fluid into the wellbore during drilling operations. The kick occurs because the pressure exerted by the column of drilling fluid is not great enough to overcome the pressure exerted by the fluids in the formation drilled.

In the control system 100, the kick control can be an automated function that combines kick detection and control, and the control system 100 can base its kick control algorithm on the modified drillers' method to manage kicks. Discussion of a kick control operation in the simulation mode is provided below with reference to FIGS. 4-8.

Briefly, the kick control algorithm constantly monitors the stream of real-time data and checks for detection parameters indicative of a kick. Once a kick is detected and if an "Auto Control" function is enabled, the kick control algorithm follows the sequence represented on the flow diagram to control the kick, circulate it out, and kill the well.

The operator can further customize a control algorithm by adding logical elements to the sequence of steps in the algorithm. In fact, the operator can construct control algorithms in the disclosed control system 100 using a sequence of steps, decisions, and actions. To customize or construct an algorithm, the operators can use drag-drop boxes and can use If-Then-Else Logic to describe a computer guided operation similar to creating a software algorithm. A screen can be provided for configuring a proportional-integral-derivative (PID) or P-I control.

F. Simulation

As noted above with reference to FIG. 2A, the control system 100 has a system panel 110 for simulations 116, which can include offline and real-time/near-real time well-site simulations. The simulation capabilities are integrated with graphing and analysis, calculation, and start/stop functionality algorithms available in the operation panel 112. Accordingly, the control system 100 in the simulation panel 116 can use all of the same modules and models 130 of the system 100 under all of the same operating modes 120 discussed previously. Results from the simulations are visually demonstrated on graphical displays similar to the operation panel 112, and selection-based reporting (through the system 100 or other reporting software) can be available for the simulations. Thus, activity-based simulations are identical to real-time operations, and the simulation results can be demonstrated through live well display and all other routine ways. Data from the simulation can be saved in a way similar to real-time operations data but in a separate storage and archival database.

The simulations can provide operators with a look ahead before performing any actual operation. In this way, the simulation panel 116 can help with developing procedures for operation and can provide training. Feedback data from the simulations can be used to improve the various models used in the control system 100, providing verification of results, outcomes, errors, etc.

As disclosed herein, one control algorithm available for both the operation and simulation panels 112, 116 is the kick control algorithm. In the case of an induced kick where the mud density is sufficient to kill the well but the reservoir has flowed as a result of pipe movement, the control system 100 and algorithm can simulate circulating the influx out of the wellbore. In the case of an underbalanced kick, the control system 100 and algorithm can simulate circulating the influx out and increasing the density of the drilling fluid. In the case of a producing well, a kill fluid with sufficient density to overcome production of formation fluid is then virtually pumped by the control system 100 and algorithm into the simulation to stop the flow of reservoir fluids.

As noted above, the simulation panel 116 can be used to predict and troubleshoot potential events, scenarios, and the like, such as a kick, while drilling operations are on-going. In other words, as the operators drill the wellbore and control operations in the operation panel 112, the operator may expect to encounter a kick as the wellbore trajectory and depth reaches a particular formation downhole, which has a certain pore pressure and other variables. To simulate the conditions that may develop during drilling as the wellbore reaches the formation, the operator can switch to the simulation panel 116 and run a kick simulation to model conditions as the drilling reaches the particular formation. The current operational data is used as the starting point of the simulation, and modeling, setup data, and the like are all used to model the future conditions over time in the simulation.

To illustrate operation of a kick control algorithm, FIG. 4 may show the main panel screen 200 of the disclosed control system 100 during simulated drilling operations. The surface back pressure is indicated at 100-psi. Managed pressure drilling controls 218 are shown, and P and I values and choke positions are indicated. Because the operators want to project into the future, the simulation panel allows the operator to advance or speed up the simulation time. For example, a time control may be available in the simulation panel for configuring the time factor for the forward-looking simulation.

At some point, the operators may want to simulate the kick event. In the kick simulation procedure, operators can simulate the kick from any rig operation by selecting the simulation in the available tools and entering or obtaining a desired kick intensity volume value. In some instances, the volume level of the kick can be manually input by the operator into a simulation input table. In such a simulation input table, the operator can select either a kick or a loss and can then enter a volume value between 0-20 Barrels or 0-840 US gallons (depending on the choice of unit). In other instances where certain well conditions are expected, the volume value may also be automatically calculated based on current well conditions and knowledge of the formations, survey, casing, drillstring, etc. Thus, the values in the input table may come from the hydraulics model, pore pressure value, and other models and parameters in the disclosed control system 100.

The operator then selects to start the simulation so that the kick control algorithm can operate on the simulated kick. The procedure for the kick control algorithm can generally follow the steps of: monitoring, detection, auto control, reaching circulation pressure, circulating influx out, kill mud falling (operator is prompted to enter in a mud that is equal to or heavier than the model calculated value), and kill mud rising up the annulus.

Figure 5:
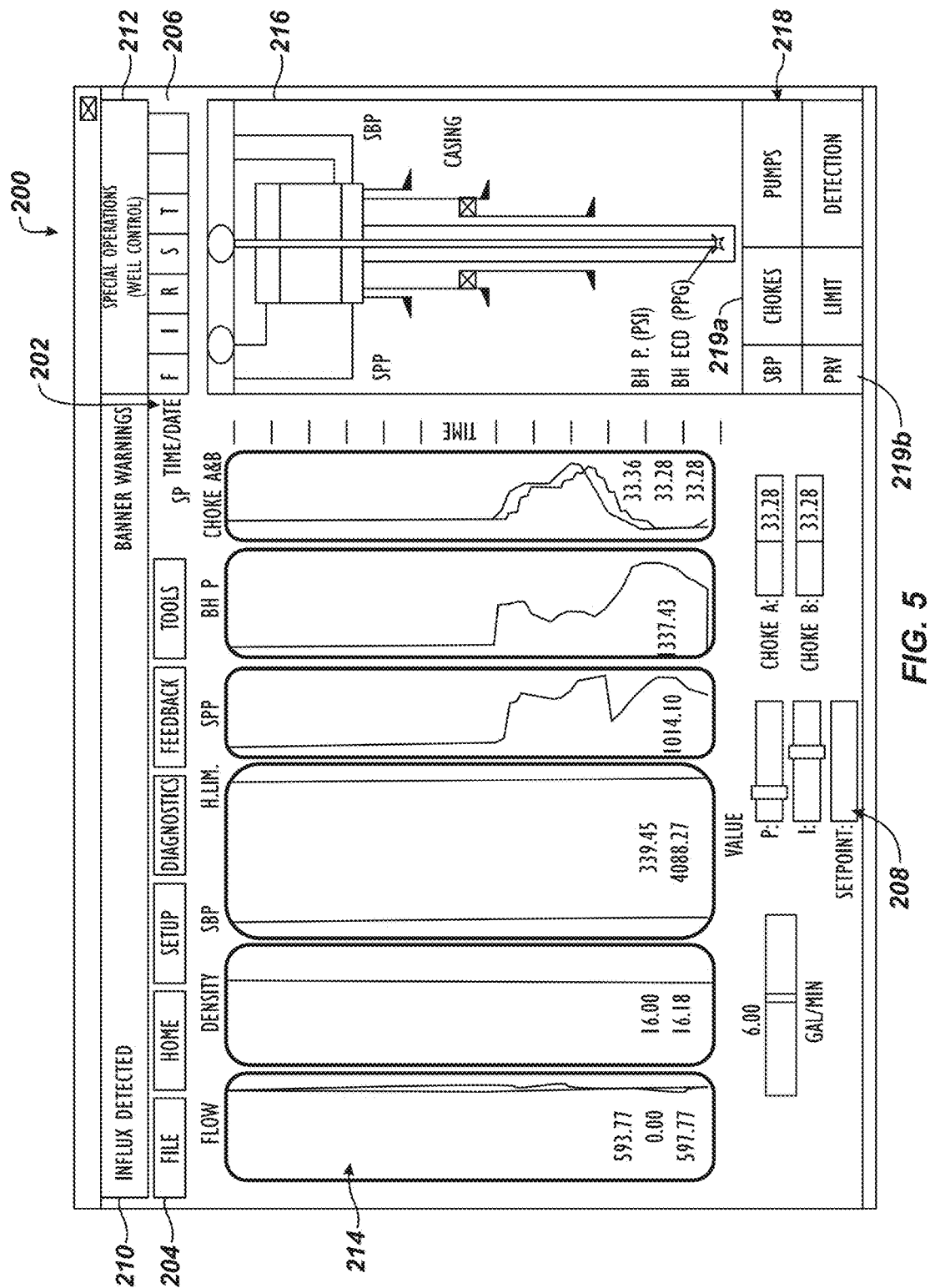
FIGS. 5-8 show a kick control operation in a simulation panel of the disclosed control system.
Figure 6:
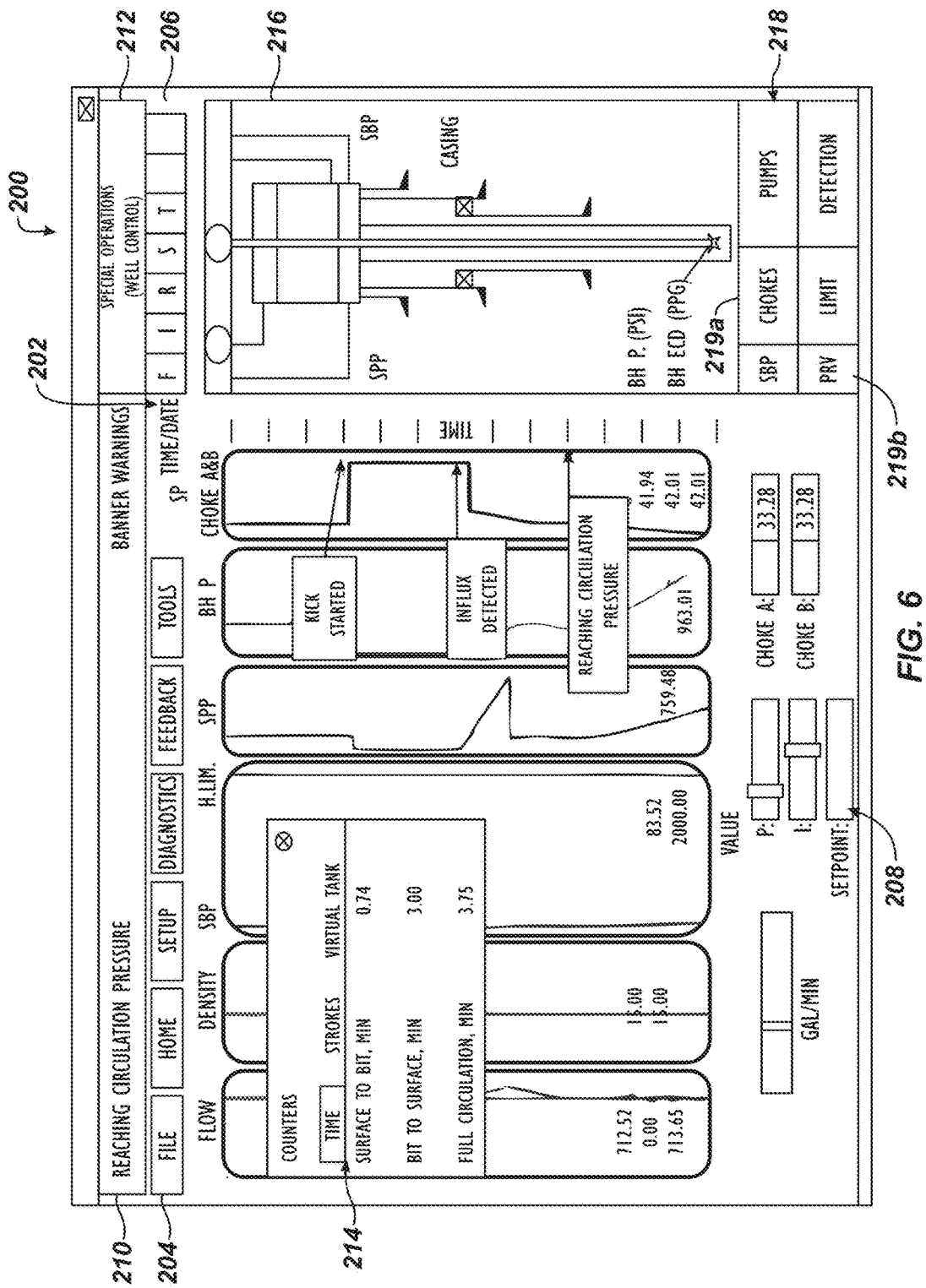

Turning to FIGS. 5-6, the main panel screen 200 of the disclosed control system 100 in the simulation panel is shown during simulated well control operations to detect and control the kick or influx. As shown, the kick or influx is detected when the well's flow-out is significantly greater than the flow-in for a specified period of time. Additionally, the SPP should not increase beyond a defined maximum allowable SPP increase, and the density-out of fluid out of the well does not drop more than a surface gas density threshold.

When the kick is detected, an alarm "influx detected" can appear on the panel's banner 210, as shown in FIG. 5. If the "auto control" function is enabled for the kick control, the control system 100 can automatically proceed to the next steps in the kick control algorithm. For example, to control the kick, the control system 100 closes the drilling system's chokes while checking the flow-in and flow-out equilibrium. The choke's movement, speed, and accuracy are determined by P (proportional gain) and I (Integral time) controls at this stage. For example, the chokes can immediately start to close to a snap position (60%) and can then continue closing more gradually.

Once the flow-out and flow-in difference is brought under control, the control system will maintain this equilibrium for a specified time before switching to the next mode. In a successful operation, the kick detection and control cycle can be expected to be managed in roughly two minutes. The kick fluid will be moving up in the annulus with full pump speed using a small decreased relative flow rate of about −0.1 gallons per minute to safely bring the formation pressure to balance.

Figure 7:
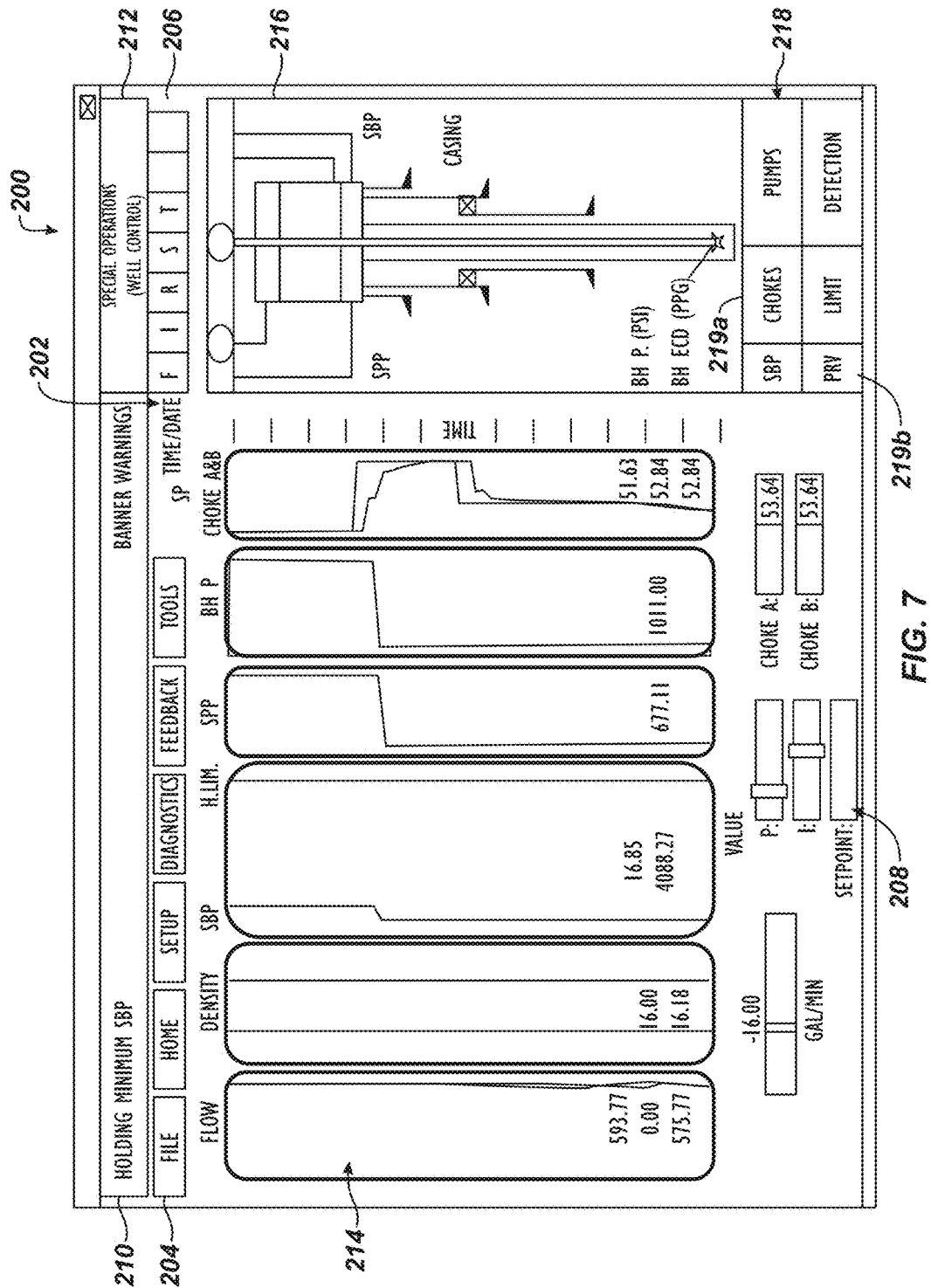

As shown in FIG. 6, the kick control algorithm in the simulation reaches circulation pressure. To do this, the control system 100 makes sure that the well is overbalanced by increasing a safety factor of the SBP using P and I control values specified for this mode. As shown in FIG. 7, the control system 100 then maintains the SBP within a maximum "pressure tolerance" oscillation range for a specified time ("time tolerance"), and then the system 100 switches to the next step. The full circulation cycle can take several minutes.

Continuing with the simulated kick control, the control system 100 circulates the influx out of the well. To do this, the system 100 switches from controlling the SBP to controlling the SPP. The system maintains the attained SPP pressure constant until the whole influx/kick is circuited out of the well, using P and I control values specified for this mode.

Figure 8:
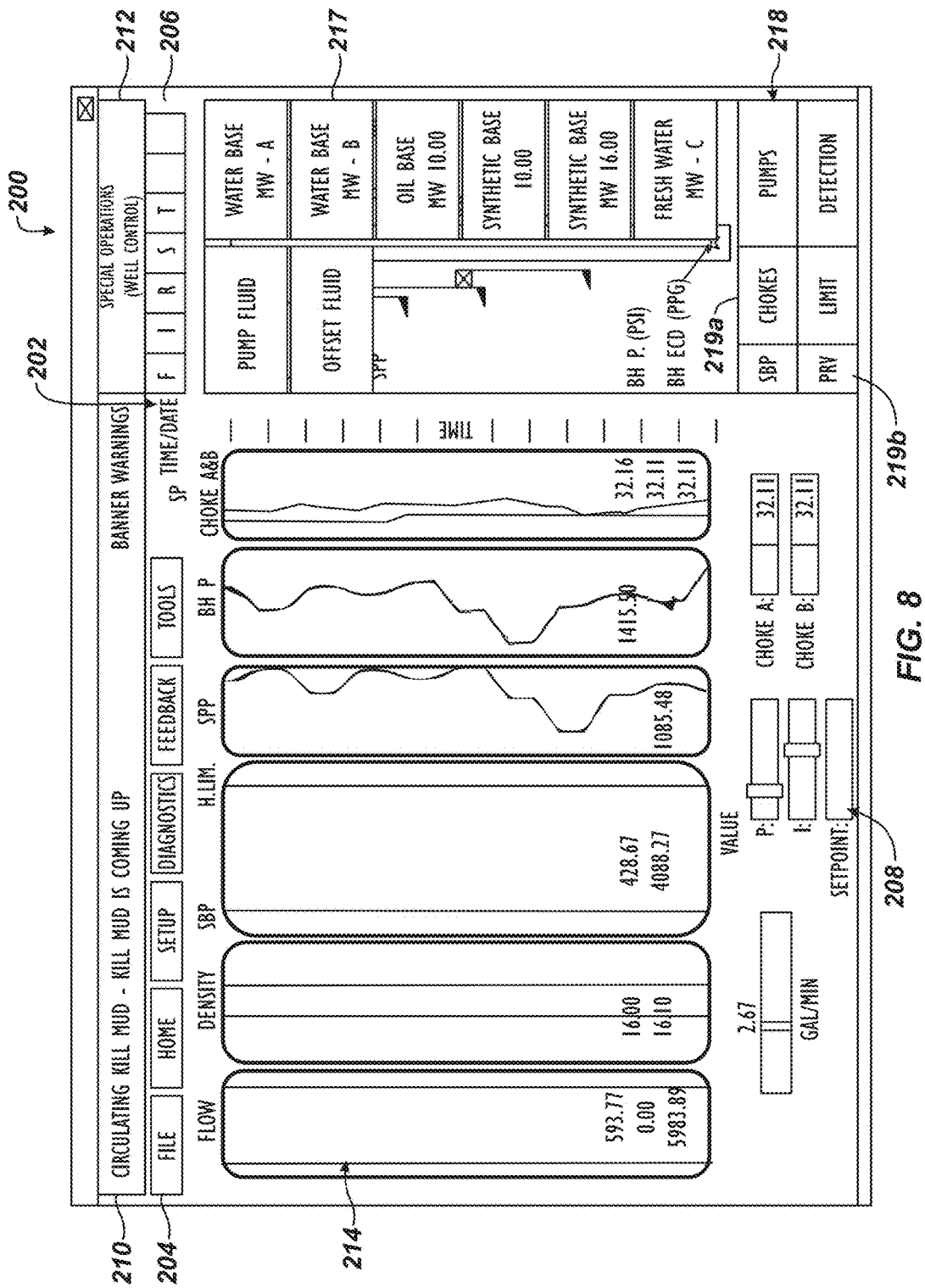

Killing the well is attempting to stop the well from flowing or having the ability to flow into the wellbore. Kill procedures typically involve circulating reservoir fluids out of the wellbore or pumping higher density mud into the wellbore, or both. If the decision is made to kill the well (and the kill mud is ready to be pumped down), the operator can select a new mud from the drop down menu 217, as shown in FIG. 8. At that time, the control system 100 switches to SBP control from SPP control to maintain SBP constant by using specified values of P and I control values for this mode. The operator can initiate pumping the new mud with the recommended or selected kill mud weight.

As the kill mud starts to go down the wellbore, the chokes start to open up gradually approaching the snap position as the kill mud circulates back up to the surface. Once the kill mud turns the bit, the control system 100 again switches back to SPP control from SBP control until the kill mud circulates all the way back up to the surface.

As disclosed above with reference to FIG. 2, the simulation panel (106) with the simulated kill control algorithm can be comparably operated on the operation panel (112) during actual drilling operations. Therefore, any of the screens 200 of FIGS. 4-8 and controls discussed above for the simulation may be the same for operations in the operating mode.

As also disclosed herein, another control algorithm available for both the operation and simulation panels 112, 116 is the loss control algorithm. As is known, fluid loss is the loss of whole drilling fluid, slurry, or treatment fluid containing solid particles into the formation matrix. The resulting buildup of solid material or filter cake may be undesirable, as may be any penetration of filtrate through the formation, in addition to the sudden loss of hydrostatic pressure due to rapid loss of fluid.

As with the kill simulation, the loss simulation can be initiated from any rig operation by selecting the loss simulation and obtaining a loss value. The recovery procedures of the loss control algorithm follow the steps of: monitoring, detection, auto control, control. The loss control algorithm runs through several steps without the need of any operator response or intervention.

Using the loss control algorithm, the control system 100 can detect fluid losses at a very early stage. In the closed-loop drilling system 10, any observed loss can only be attributed to the formation, whereas in normal drilling a mud loss is detected at the pits and could be attributed to several things, including loss from solids control equipment, cuttings with mud, evaporation, downhole losses, or surface leaks.

Sometimes, the well may experience a partial downhole loss but, as the amount is not significant, it may not be attributed correctly. This delay in detecting the partial loss might lead to a more severe condition of inducing and propagating a fracture, leading to a severe or total loss situation.

When using the control system 100, a fluid loss can be detected very early, before the total lost volume may reach values as low as 0.5-bbl. The control system 100 displays a message alerting the potential problem, allowing timely actions to be employed to prevent the losses from becoming total. With the accuracy of the system 100, it is possible to even identify the severity of the loss, from the discrepancy observed from the flows being measured. A total loss of circulation condition may also be spotted very early, with the flow out showing a sudden drop to zero, allowing the operators to take the necessary steps to prevent a well control event caused by loss of the hydrostatic column.

As the choke is kept fully open while drilling, the control system 100 cannot take any action to reduce the surface backpressure with the choke movement. The message displayed on the main panel screen in the control system 100 when the loss is detected is a signal to the operator to reduce flow rate. For example, the losses may be induced by the dynamic (friction) pressure due to a particular circulation rate.

The loss control algorithm can be an automated function that operates while applying moderately excessive pressure on the wellbore. The control system 100 monitors the stream data and checks for detection parameters. Once detection requirements are fulfilled and if the "auto" function is on, the control system 100 then controls the loss by manipulating pressure.

For detection, the loss control algorithm can monitor for a loss condition where the well is losing fluid, specifically the flow-out is less than flow-in with the "flow difference" lasting a specified period of time ("time tolerance"). When the loss is detected, an alarm "loss detected" can appear on the panel's banner for the operator. Because the choke is kept fully open while drilling, the system cannot take any action to reduce the surface back pressure with the choke movement. Therefore, the message displayed when the loss is detected can signal to have the flow rate reduced. For example, the losses may be induced by the dynamic (friction) pressure due to a particular circulation rate. Further actions can involve pumping lost circulation material to try to eliminate the problem.

If the "auto control" function is enabled or the operator initiates next steps, the control system 100 can proceed to additional loss control step. In these steps, loss control can be an automated function that is utilized while applying additional pressure to the wellbore. The control system 10 monitors the data stream and checks for detection parameters. Once detection requirements are fulfilled, the system 10 controls the loss by manipulating pressure. For instance, to control the loss, the control system 10 can open the choke and decrease the amount of pressure applied until flow-in and flow-out are equalized by using specified values for P and I control in this mode. The system 100 will stop and maintain the minimum allowable SPP, the minimum allowable SBP, and/or the minimum allowable BHP depending on which is reached first.

G. Diagnostic

The control system 100 can provide diagnostics of the various components of the disclosed drilling system 10, including diagnostics about raw data, WITS RX (continuous flow of received data), WITS TX (continuous flow of transmitted data), chokes, flow meter, sensors, RCD, DDV, pumps, database, ICU, and any of the simulation models. From the main panel screen 200, details about diagnostics, failures, and alerts for the various components may be displayed in the main banner 210 to notify the operator. Any of the diagnostic screens can be accessed using the disclosed control system 100 during operations and the like.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of performing controlled pressure drilling of a borehole in a formation with a drilling system according to a drilling plan, the method comprising:
    configuring, with a computerized control system, a setup of at least the drilling plan, the formation, and the drilling system;
    performing the controlled pressure drilling of the borehole in the formation with the drilling system according to the drilling plan by: integrating the setup of the computerized control system with the drilling system, acquiring current data of at least the drilling system, and functioning the drilling system with the computerized control system using the acquired data in an operating mode for operational interaction with the drilling system;
    switching, at the computerized control system, from the operating mode to a simulating mode in response to an event anticipated in the drilling operation according to the drilling plan for simulated interaction with the drilling system while continuing the controlled pressure drilling with the drilling system;
    simulating the functioning of the drilling system with the computerized control system for a future time period using simulated data in the simulating mode; and
    using a result from the simulated interaction in the operational interaction with the drilling system.

2. The method of claim 1, wherein configuring the setup comprises configuring information pertaining to the borehole, the formation, surface equipment, piping, wellsite data, casing, drillstring, drilling trajectory, and fluid properties.

3. The method of claim 1, wherein simulating the functioning in the simulating mode comprises:
    simulating the functioning with at least one simulated operation projected over the future time period in the future.

4. The method of claim 3, wherein simulating the functioning with the at least one simulated operation projected over the future time period in the future comprises setting a rate at which the future time period advances in the future for the at least one simulated operation.

5. The method of claim 3, wherein simulating the functioning with the at least one simulated operation projected over the future time period in the future comprises modeling, with one or more algorithms of the computerized control system, the functioning of the at least one simulated operation to drill the borehole in the formation with the drilling system according to the drilling plan.

6. The method of claim 3, wherein using the result from the simulated interaction in the operational interaction with the drilling system comprises:
    switching, at the computerized control system, from the simulating mode back to the operating mode; and providing, at the computerized control system, the result of the at least one simulated operation from the simulating mode within the operating mode.

7. The method of claim 6, wherein the at least one simulated operation comprises the anticipated event; wherein the provided result comprises a modelled response for the anticipated event; and wherein the method further comprises:
monitoring for the anticipated event; and
at least partially implementing the modelled response.

8. The method of claim 1, wherein functioning in the operating mode comprises functioning according to a first of a plurality of operations for operating the drilling system within the operating mode.

9. The method of claim 8, wherein simulating the functioning in the simulated mode comprises simulating the functioning according to a second of the operations for operating the drilling system within the simulating mode.

10. The method of claim 8, wherein the operations comprise one or more of: an in-casing test operation, a drilling operation of performing the controlled pressure drilling of the borehole, a connection operation of performing a connection of drillpipe, a tripping operation of tripping drillpipe out of the borehole, a circulation operation of circulating fluid in the borehole, a reaming operation of reaming the borehole, a well control operation of handling a kick or a loss while drilling the borehole, and an offline operation.

11. The method of claim 10, wherein the operations comprise one or more controls selected from the group consisting of a proportional gain control, an integral time control, a choke control, a connection control, a Leak Off Test (LOT), a Formation Integrity Test (FIT), a cement control, a pill, a kick control, and a loss control.

12. The method of claim 1, further comprising:
a monitoring mode for monitoring current interaction with the drilling system; and
a reviewing mode for replaying past interaction with the drilling system.

13. The method of claim 1, the method further comprising:
indicating, at the computerized control system, a selection of one of a plurality of control modes for interacting with the drilling system, the control modes at least including (i) the operating mode for the operational interaction with the drilling system and (ii) the simulating mode for the simulated interaction with the drilling system;
indicating, at the computerized control system, a selection of one of a plurality of operations for operating the drilling system; and
wherein the act of functioning comprises functioning the drilling system with the computerized control system according to the selected operation within the selected control mode.

14. The method of claim 1, wherein functioning the drilling system using the acquired data in the operating mode for the operational interaction with the drilling system comprises using one or more automated controls automatically controlling the functioning of the drilling system and using one or more manual controls manually controlling the functioning of the drilling system.

15. The method of claim 1, wherein simulating the functioning of the drilling system with the computerized control system for the future time period using the simulated data in the simulating mode comprises selecting a plurality of simulated operations for responding to the anticipated event, simulating the functioning of the drilling system by running the selected simulated operations; and determining one of the selected simulated operations based on simulated results from the simulated functioning.

16. The method of claim 15, wherein using the result from the simulated interaction in the operational interaction with the drilling system comprises running the determined one of the selected simulated operations in response to an occurrence of the anticipated event in the drilling operation.

17. The method of claim 16, further comprising comparing the simulated result to an actual result of running the determined one of the selected simulated operations; and refining at least the determined one of the selected simulated operations based on the comparison.

18. A programmable storage device having program instructions stored thereon for causing a programmable control device to perform a method of performing controlled pressure drilling of a borehole in a formation with a drilling system according to a drilling plan, the method comprising:
configuring, with the programmable control device, a setup of at least the drilling plan, the formation, and the drilling system;
performing the controlled pressure drilling of the borehole in the formation with the drilling system according to the drilling plan by: integrating the setup of the programmable control device with the drilling system, acquiring current data of at least the drilling system, and functioning the drilling system with the programmable control device using the acquired data in an operating mode for operational interaction with the drilling system;
switching, at the programmable control device, from the operating mode to a simulating mode in response to an event anticipated in the drilling operation according to the drilling plan for simulated interaction with the drilling system while continuing the controlled pressure drilling with the drilling system;
simulating the functioning of the drilling system with the programmable control device for a future time period using simulated data in the simulating mode; and
using a result from the simulated interaction in the operational interaction with the drilling system.

19. The programmable storage device of claim 18, wherein simulating the functioning of the drilling system with the computerized control system for the future time period using the simulated data in the simulating mode comprises selecting a plurality of simulated operations for responding to the anticipated event, simulating the functioning of the drilling system by running the selected simulated operations; and determining one of the selected simulated operations based on simulated results from the simulated functioning.

20. The programmable storage device of claim 19, wherein using the result from the simulated interaction in the operational interaction with the drilling system comprises running the determined one of the selected simulated operations in response to an occurrence of the anticipated event in the drilling operation.

21. The programmable storage device of claim 20, further comprising comparing the simulated result to an actual result of running the determined one of the selected simulated operations; and refining at least the determined one of the selected simulated operations based on the comparison.

22. A computerized control system for a drilling system that performs controlled pressure drilling of a borehole in a formation according to a drilling plan, the system comprising:

storage storing information pertaining at least to the formation, the drilling system, and the drilling plan;

communication equipment in communication with the drilling system; and processing equipment in communication with the storage and the communication equipment, the processing equipment configured to:

configure a setup of at least the drilling plan, the formation, and the drilling system;

integrate the setup with the drilling system to acquire current data of at least the drilling system;

function the drilling system using the acquired data in an operating mode for operational interaction with the drilling system to perform the controlled pressure drilling of the borehole in the formation with the drilling system according to the drilling plan;

switch from the operating mode to a simulating mode in response to an event anticipated in the drilling operation according to the drilling plan for simulated interaction with the drilling system;

simulating for a future time period the functioning of the drilling system using simulated data in the simulation mode for simulated interaction with the drilling system; and use a result from the simulated interaction in the operational interaction with the drilling system.

* * * * *